United States Patent
Trent, Jr. et al.

(10) Patent No.: US 7,502,016 B2
(45) Date of Patent: *Mar. 10, 2009

(54) CLOSED-LOOP SENSOR ON A SOLID-STATE OBJECT POSITION DETECTOR

(75) Inventors: Raymond A. Trent, Jr., San Jose, CA (US); Scott J. Shaw, Fremont, CA (US); David W. Gillespie, Los Gatos, CA (US); Christopher Heiny, Boulder Creek, CA (US); Mark A. Huie, San Carlos, CA (US)

(73) Assignee: Synaptics Incorporated, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/925,513

(22) Filed: Oct. 26, 2007

(65) Prior Publication Data
US 2008/0048978 A1 Feb. 28, 2008

Related U.S. Application Data

(63) Continuation of application No. 10/338,765, filed on Jan. 7, 2003.

(60) Provisional application No. 60/372,009, filed on Apr. 11, 2002.

(51) Int. Cl.
*G06F 3/41* (2006.01)
(52) U.S. Cl. .................................. 345/173; 345/156
(58) Field of Classification Search ................. 345/156, 345/173–177; 178/18.01, 18.07
See application file for complete search history.

(56) References Cited

U.S. PATENT DOCUMENTS

| 6,259,432 B1 | 7/2001 | Yamada et al. |
| 7,233,316 B2 | 6/2007 | Smith et al. |

*Primary Examiner*—Ricardo L Osorio
(74) *Attorney, Agent, or Firm*—Ingrassia, Fisher & Lorenz, P.C.

(57) ABSTRACT

The present disclosure discloses an object position detector. The object position detector comprises a touch sensor formed as a closed loop and having a physical constraint formed on an upper surface of the touch sensor and coextensive with the closed loop. The touch sensor is configured to sense motion of an object proximate to the closed loop. The object position detector also comprises a processor coupled to the touch sensor and is programmed to generate an action in response to the motion on the touch sensor.

20 Claims, 17 Drawing Sheets

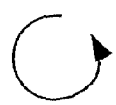    
Fig. 11　　Fig. 12　　Fig. 13　　Fig. 14　　Fig. 15
 
Fig. 16　　　　Fig. 17
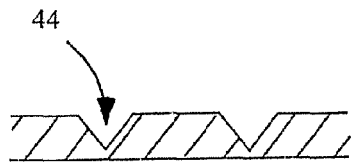 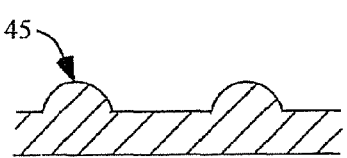 
Fig. 18　　Fig. 19　　Fig. 20
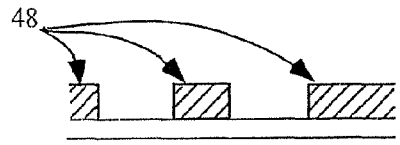
Fig. 21
Fig. 22 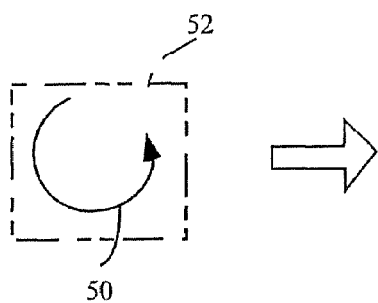 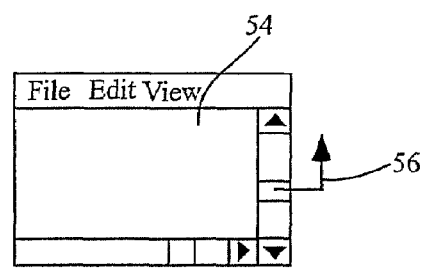
Fig. 23 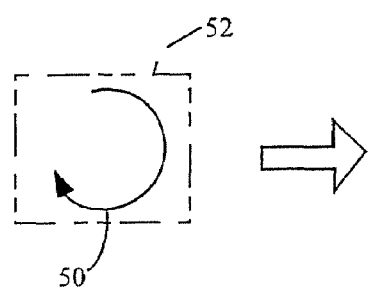 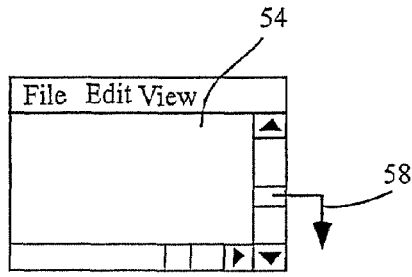

CLOSED-LOOP SENSOR ON A SOLID-STATE OBJECT POSITION DETECTOR

CROSS-REFERENCES TO RELATED APPLICATIONS

This application is a continuation of U.S. application Ser. No. 10/338,765, filed Jan. 7, 2003, which claims the benefit of U.S. Provisional Application No. 60/372,009, filed Apr. 11, 2002.

BACKGROUND

User interfaces on digital information processing devices often have more information and options than can be easily handled with buttons or other physical controls. In particular, scrolling of documents and data, selection of menu items, and continuous value controls, such as volume controls, can be difficult to control with buttons and general purpose pointing devices. These buttons and pointing devices are inherently limited in how far they can move or how many options can be selected. For example, a computer mouse, though it can move a pointer or cursor indefinitely, has limits to how far it can move without being picked up and repositioned, which limits its usability in these situations.

Solutions to this problem have included:

a. Keys, such as "page up" and "page down" and arrow keys, that are specifically designated to maneuver through or control data;

b. Provisions for scrollbars in a user interface which can be used to scroll data long distances by using a standard computer pointing device controlling a cursor;

c. Similarly controlled (as in b.) hierarchical menus or choices;

d. Graphical user interface elements such as "slider bars" and "spin controls" to vary a parameter over an arbitrary range;

e. Scrolling "wheels" on standard pointing devices;

f. Physical knob controls, which, when used to control a user interface are often referred to in the art as "jog dials". Some knobs and dials output quadrature signals to indicate direction of motion;

g. Trackballs that rely on optically or mechanically sensed spherical controls to provide two-dimensional sensing; and h. A capacitive two-dimensional object position sensor that can be used for scrolling by providing a "scrolling region", where users can slide their fingers to generating scrolling actions.

The disadvantages of these prior solutions are as follows:

a. Designated Keys: These typically require designated space on the keyboard as well as supporting electronics and physical structures. Keys usually limit the control they offer to the user over the information being scrolled or the function being performed to distinct values. For example, page up and page down keys enable the user to increment through a document at a constant rate of page by page only.

b. Scroll bars controlled by a pointing device and a cursor: These elements require the user to move long distances across a display and/or select relatively small controls in order to scroll the data. Additionally, these scroll bars take up room on the display that can be used for other purposes.

c. Hierarchical menus controlled by a pointing device or by key combinations: These have a similar problem to scroll bars, in terms of the complexity of the targeting task that faces the user. First, the user must hit a small target near the edge of a screen, and then the user must navigate along narrow paths to open up additional layers of menu hierarchy. Shortcut keys, which usually consist of key combinations, are typically non-intuitive and hard to remember.

d. "Sliders" and "spin controls" controlled by a pointing device or by key combinations: These have targeting problems similar to scroll bars and hierarchical menus (sometimes exacerbated by the targets usually being even smaller than in the cases of scrollbars and menus).

e. Physical Scroll Wheels on mice: The user is unable to scroll very far with these wheels due to mechanical limitations in how far the user can move the wheel in a single stroke. These mechanical limitations are because of the construction of the wheel itself or because of interactions between the wheel and nearby physical features (such as the wheel mounting or the device housing). The limits on the practical/comfortable length of the basic finger motion also severely restrict the ability of the user to scroll significant distances in one stroke. Additionally, these wheels are mechanically complex and take up a lot of space.

f. Physical knobs or "Jog Dial" controls: These have the disadvantages of being relatively large and mechanically complex. Similar to the scroll wheel, the knob or dial requires some amount of friction to limit accidental activation, which increases the difficulty of fine adjustments. Additionally, it is difficult to use a physical knob or dial with a great degree of accuracy, and the knob or dial inherently has inertia that may cause overshoot in large motions. The physical knobs or dials are often mechanically limited in range of rotation imposed by the construction or by the interactions of the knob or dial with nearby physical features.

g. Trackballs: These are similar to the physical knobs in that they have the disadvantages of being bulky and mechanically complex. The trackball is difficult to use with a great degree of accuracy, and the trackball inherently has inertia that may cause overshoot in large motions. Additionally, the trackball presents additional complexity in that it presents control of two dimensions of motion in a way that makes it difficult for users to limit their inputs to a single dimension. Finally, the input is limited either by the construction of the trackball and its housing, or by natural limits on comfortable/practical finger motion, or both.

h. Scroll Regions: These are limited by the physical limitation that a user's finger will eventually reach the end of the scrolling region and the user will have to lift their finger, replace it on the sensor inside the region, and continue the motion. The user must perform many repetitive motions of the same finger to scroll long distances with a scroll region.

The disadvantages of the prior art can be remedied by devising a user interface that enables scrolling, selecting, and varying controls over a long range of possible positions and values.

SUMMARY

The drawbacks and disadvantages of the prior art are overcome by a closed-loop sensor on a solid-state object position detector.

The present disclosure discloses a solid-state object position detector. The solid-state object position detector comprises a touch sensor formed as a closed loop having a physical constraint formed on an upper surface of the touch sensor and coextensive with the closed loop. The touch sensor is configured to sense motion of an object proximate to the closed loop. The object position detector also comprises a processor coupled to the touch sensor and is programmed to generate an action in response to the motion on the touch sensor.

The present disclosure also discloses a solid-state object position detector, comprising a two-dimensional touch sensor having a tactile guide formed on an upper surface of, and coextensive with, the two-dimensional touch sensor. The two-dimensional touch sensor is configured to sense motion of an object proximate to the two-dimensional touch sensor. The solid-state object position detector also comprises a processor coupled to the two-dimensional touch sensor and configured to report only one variable indicating the position, such as the angular position, of an object proximate to the two-dimensional touch sensor. The processor is programmed to generate an action in response to the motion on the two-dimensional touch sensor.

The present disclosure also discloses a combination comprising a solid-state object position detector, a pointing input device, and a processor. The solid-state object position detector has a touch sensor formed as a closed loop. The solid-state object position detector has a tactile guide formed on an upper surface of the touch sensor and coextensive with the closed loop. The touch sensor is configured to sense a first position of an object proximate to the closed loop. The pointing input device is disposed proximate to the solid-state object position detector and is configured to sense a first pointing input of a user. The processor is coupled to the solid-state object position detector and to the pointing input device. The processor is programmed to generate at least one action in response to the first position and at least one action in response to the first pointing input. The pointing input device can be a mouse, a touch pad, a pointing stick, a slider, a joystick, a touch screen, a trackball or another solid-state object position detector.

The present disclosure also discloses another embodiment of a combination comprising a solid-state object position detector, a control input device, and a processor. The solid-state object position detector has a touch sensor formed as a closed loop. The solid-state object position detector has a tactile guide formed on an upper surface of the touch sensor and coextensive with the closed loop. The touch sensor is configured to sense a first position of an object proximate to the closed loop. The control-input device is disposed proximate to the solid-state object position detector and is configured to sense a first control input of a user. The processor is coupled to the solid-state object position detector and to the control input device. The processor is programmed to generate at least one action in response to the first position and at least one action in response to the first control input. The control input device can be a button, a key, a touch sensitive zone, a scrolling region, a scroll wheel, a jog dial, a slider, a touch screen, or another solid-state object position detector.

The present disclosure also discloses a solid-state object position detector, comprising a touch sensor having a first electrode and a plurality of second electrodes disposed in a one-dimensional closed loop and proximate to the first electrode. The solid-state object position detector also comprises a processor coupled to the touch sensor. The processor generates an action in response to user input on the touch sensor. The complexity of the sensing circuitry used in the plurality of second electrodes can be reduced, such that when only relative positioning is necessary, at least two of the plurality of second electrodes are electrically connected or wired together.

The present disclosure also discloses a combination comprising a solid-state object position detector, a touch pad, and a processor. The solid-state object position detector comprises a touch sensor having a first electrode and a plurality of second electrodes disposed in a one-dimensional closed loop and proximate to the first electrode. The touch pad has a plurality of X electrodes and a plurality of Y electrodes. The first electrode is electrically coupled to at least one of the plurality of X electrodes and the plurality of Y electrodes. The processor is coupled to the touch sensor and to the input device. The processor generates an action in response to user input on at least one of the touch sensor and the touch pad. The complexity of the sensing circuitry used in the plurality of second electrodes can be reduced, such that when only relative positioning is necessary, at least two of the plurality of second electrodes are electrically connected or wired together.

The present disclosure also discloses a solid-state object position detector, comprising a touch sensor having a plurality of interleaving electrodes disposed proximate to a one-dimensional closed loop; wherein each electrode is interdigitated with an adjacent neighboring electrode. The solid-state object position detector also comprises a processor coupled to the touch sensor. The processor generates an action in response to user input on the touch sensor.

The present disclosure also discloses a solid-state object position detector, comprising a touch sensor having a plurality of self-interpolating electrodes disposed proximate to a closed loop. The solid-state object position detector also comprises a processor coupled to the touch sensor. The processor generates an action in response to user input on the touch sensor.

The present disclosure also discloses a method of calculating a position of an object on an object position detector comprising receiving positional data from the object on a touch sensor having a closed loop and interpolating the positional data to determine a position of the object on the one-dimensional closed loop. The interpolating aspect of the method further includes performing a quadratic fitting algorithm, a centroid interpolation algorithm, a trigonometric weighting algorithm, or a quasi-trigonometric weighting algorithm.

The present disclosure also discloses a method of determining motion of an object on a touch sensor of an object position detector. The method comprises receiving data of a first position of the object on a closed loop on a touch sensor of the object position detector, receiving data of a second position of the object on the closed loop, and calculating motion from the second position and the first position. The method can further comprise determining if the motion is equal to or greater than a maximum angle and adjusting the motion based on whether the motion is equal or greater than the maximum angle. The method of adjusting the motion can be subtracting 360° from the motion. The method can further comprise determining if the motion is less than a minimum angle and adjusting the motion based on whether the motion is less than the minimum angle. The method of adjusting the motion can be adding 360° to the motion.

BRIEF DESCRIPTION OF FIGURES

Referring now to the figures, wherein like elements are numbered alike:

FIGS. 11 to 17 illustrate various shapes of the path utilized on a closed-loop sensor;

FIG. 18 illustrates a cross-sectional view of V-shaped depressed grooves that define the path on a closed-loop sensor;

FIG. 19 illustrates a cross-sectional view of a raised projection that defines the path on a closed-loop sensor;

FIG. 20 illustrates a cross-sectional view of U-shaped depressed grooves that define the path on a closed-loop sensor;

FIG. 21 illustrates a cross-sectional view of a bezel that defines the path on a closed-loop sensor;

FIGS. 22 and 23 illustrate the motions of an input object on a closed-loop sensor and the effects on a host device;

DETAILED DESCRIPTION

Those of ordinary skill in the art will realize that the following description of the present invention is illustrative only and not in any way limiting. Other embodiments of the present invention will readily suggest themselves to such skilled persons.

An object position detector is disclosed comprising a touch (or proximity) sensor (or touch pad or touch screen or tablet), such as a capacitive, resistive, or inductive sensor designed to sense motions along a substantially closed loop, and referred to herein as a closed-loop sensor. This closed-loop sensor can be used to enhance the user interface of an information-processing device. A loop area on a closed-loop sensor can be defined by a tactile guide. Preferably, the closed-loop sensor is defined by a physical constraint. The position of an input object (or finger or pointer or pen or stylus or implement) is measured along this loop. When the input object moves along this loop, a signal (or instruction) is generated that causes an action at the host device. For example, when the input object moves in the clockwise direction along this loop, a signal is generated that can cause the data, menu option, three dimensional model, or value of a setting to traverse in a particular direction; and when the input object moves in the counter-clockwise direction, a signal is generated that can cause traversal in an opposite direction. This looping motion of the input object within the loop area need only be partially along the loop, or if the looping motion completes one or more loops, be approximate and notional. A strict loop can imply that the input object would eventually return to exactly the same position on the sensor at some point. However, the sensor may report the input object's position with greater accuracy than the input object can actually repeatably indicate a position. Hence, enabling the sensor to accept a close approximation to a loop as a completed loop is desirable.

A closed-loop sensor can be physically designed or electrically laid out in such a way as to naturally report in only one coordinate. This single coordinate design, which will be referred to as "one-dimensional" within this document, is one-dimensional in that the closed-loop sensor inherently outputs information only in one variable; the closed-loop sensor itself may physically span two or more dimensions. For example, a closed-loop sensor can consist of a loop of capacitive electrodes arranged along the perimeter of a closed loop of any shape herein described. The absolute position of the input object on a one-dimensional closed-loop sensor can be reported in a single coordinate, such as an angular (θ) coordinate, and the relative positions (or motions) of the input object can be reported in the same (such as angular) units as well.

Figure 1:
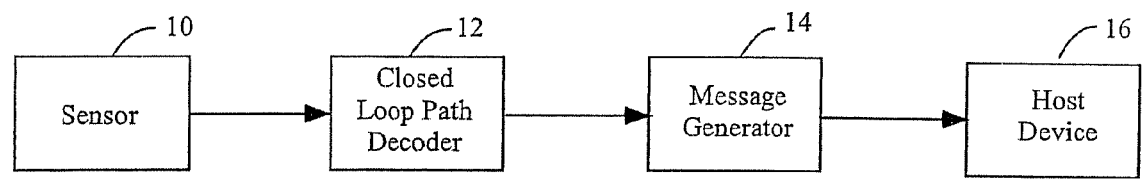
FIG. 1 illustrates a block diagram of a solid-state closed-loop sensor.

The operation of the present invention with a host device is illustrated in the block diagram of FIG. 1. A signal is generated at the closed-loop sensor 10 and is then decoded by the closed-loop path decoder 12. A message is generated by the message generator 14 and the message is transmitted to the host device 16. The host device 16 then interprets the message and causes the appropriate action on a display (not shown).

Host device 16 is a processing system. The following is a description of an exemplary processing system. However, the exact configuration and devices connected to the processing system may vary.

The processing system has a Central Processing Unit (CPU). The CPU is a processor, microprocessor, or any combination of processors and/or microprocessors that execute instructions stored in memory to perform an application or process. The CPU is connected to a memory bus and an Input/Output (I/O) bus.

A non-volatile memory such as Read Only Memory (ROM) is connected to CPU via the memory bus. The ROM stores instructions for initialization and other systems commands of the processing system. One skilled in the art will recognize that any memory that cannot be written to by the CPU may be used for the functions of the ROM.

A volatile memory such as a Random Access Memory (RAM) is also connected to the CPU via the memory bus. The RAM stores instructions for processes being executed and data operated upon by the executed processes. One skilled in the art will recognize that other types of memories, such as flash, DRAM and SRAM, may also be used as a volatile memory and that memory caches and other memory devices may also be connected to the memory bus.

Peripheral devices including, but not limited to, a storage device, a display, an I/O device, and a network connection device are connected to the CPU via an I/O bus. The I/O bus carries data between the devices and the CPU. The storage device stores data and instructions for processes unto a media. Some examples of a storage device include read/write compact discs (CDs), and magnetic disk drives. The display is a monitor or other visual display and associated drivers that convert data to a display. An I/O device is a keyboard, a pointing device or other device that may be used by a user to input data. A network device is a modem, Ethernet "card", or other device that connects the processing system to a network. One skilled in the art will recognize that exact configuration and devices included in or connected to a processing system may vary depending upon the operations that the processing system performs.

Figure 2:
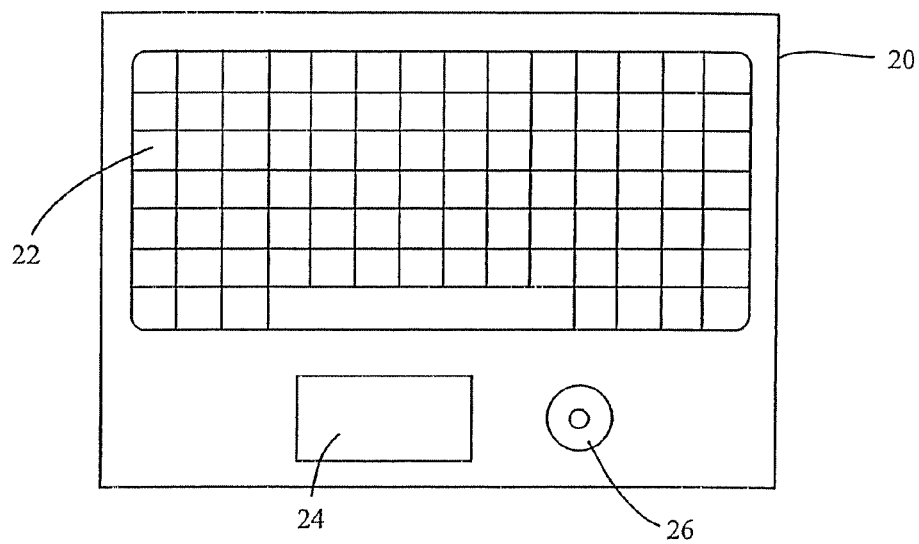
FIG. 2 illustrates a location of a closed-loop sensor on a laptop near a keyboard.
Figure 3:
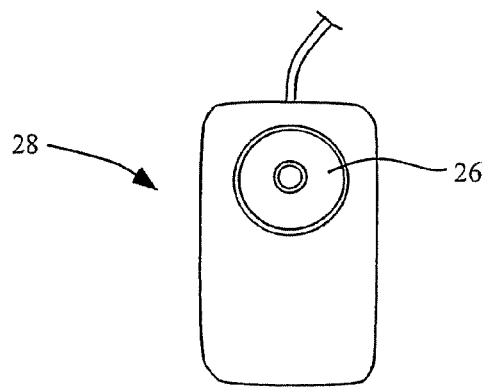
FIG. 3 illustrates a closed-loop sensor disposed on a conventional pointing device.

The closed-loop sensor (or several closed-loop sensors) can be disposed in any location that is convenient for its use with a host device, and optional other input devices. A host system can be a computer, a laptop or handheld computer, a keyboard, a pointing device, an input device, a game device, an audio or video system, a thermostat, a knob or dial, a telephone, a cellular telephone, or any other similar device. For example, the closed-loop sensor can be positioned on a laptop near the keyboard as illustrated in FIG. 2. The base 20 of the laptop is illustrated having a keyboard 22, a touch pad (or touch screen) 24, and a closed-loop sensor 26. Alternative positions include positioning the closed-loop sensor on or connecting it to a conventional computer or keyboard. FIG. 3 illustrates the closed-loop sensor 26 disposed on a conventional pointing device 28. Conventional pointing device 28 may have other features, such as left click or right click buttons, which are not shown.

The closed-loop sensor of the present invention can also be implemented as a stand-alone device, or as a separate device to be used with another pointing input device such as a touch pad or a pointing stick. The closed-loop sensor of the present invention can either use its own resources, such as a processor and sensors, or share its resources with another device. The closed-loop sensor can be a capacitive, resistive, or inductive touch or proximity (pen or stylus) sensor. A capacitive sensor is preferred, and is illustrated herein.

The closed-loop sensor can be implemented as a stand-alone sensor, which can then be used as a replacement for one or more knobs, sliders, or switches on any piece of electronic equipment. In some cases, it might be desirable to provide visual feedback indicating the "current" setting of the virtual knob, such as a ring of light emitting diodes (LEDs) surrounding the closed-loop region. An Etch-a-Sketch™ type of electronic toy can be implemented using a single position detector with two closed-loop sensors or two position detectors with one closed-loop sensor each. Many other toys and consumer appliances currently have knobs used in similar ways that can benefit from the present invention.

Figure 4:
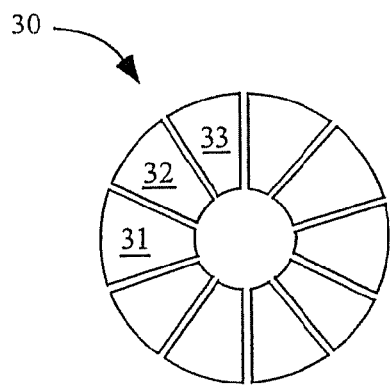
FIG. 4 illustrates wedge-shaped electrodes of a closed-loop sensor.
Figure 5:
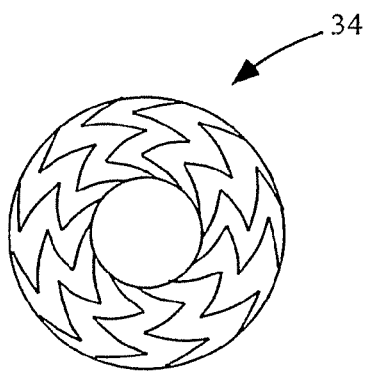
FIG. 5 illustrates lightning-bolt-shaped electrodes of a closed-loop sensor.

The closed-loop sensor can have electrodes (or sensor pads) that are of various shapes and designs (e.g., a simple wedge or pie-shape, a lightning-bolt or zigzag design, triangles, outward spirals, or the like) configured in a closed-loop path. A closed-loop sensor 30 having wedge-shaped electrodes is illustrated in FIG. 4, while a closed-loop sensor 34 having lightning-bolt-shaped electrodes is illustrated in FIG. 5. The sensor pattern can be designed so that it can have continuous interpolation between the electrodes. The sensor pattern can also be designed so that the electrodes interleave between each other to help spread the user's input signal over several electrodes.

FIG. 4 illustrates the wedge- (or pie-) shaped electrodes in a closed-loop capacitive sensor 30. When an input object (or finger or pointer or stylus or pen or implement) is over first electrode 31, only the first electrode 31 senses the largest change in capacitance. As the input object moves clockwise toward electrodes 32 and 33, the signal registered by first electrode 31 gradually decreases as the signal registered by the second electrode 32 increases; as the input object continues to move further clockwise toward third electrode 33, the first electrode 31 signal drops off and the third electrode 33 starts picking up the input object, and so on. By processing the electrode signals in largely the same way as for a standard linear sensor, and taking into account that there is no true beginning or end to the closed-loop sensor, the object position detector having the wedge sensor can interpolate the input object's position accurately.

FIG. 5 illustrates the lightning-bolt-shaped electrodes in a closed-loop sensor 34. The lightning-bolt design helps spread out the signal associated with an input object across many electrodes by interleaving adjacent electrodes. The signals on a closed-loop sensor with lightning-bolt shaped electrodes are spread out in such a way that the electrode closest to the actual position of the input object has the largest signal, the nearby electrodes have the next largest signal, and the farther electrodes have small or negligible signals. However, comparing a lighting-bolt sensor with a wedge sensor with a similar size and number of electrodes, an input object on the lightning-bolt sensor will typically couple to more electrodes than in the wedge sensor. This means that the lighting-bolt sensor will have more information about the input object's position than a wedge sensor, and this effect helps increase sensor resolution and accuracy in sensing the input object's position. For best results, the electrodes of the lightning bolt sensor need to be sufficiently jagged in shape such that the input object on the sensor will always cover more than one electrode. The interleaving nature of this electrode design means that the spacing from one electrode to the next can be larger than in the wedge sensor while still providing similar resolution and accuracy. The spacing from one electrode to the next with such an interdigitated electrode design may even be considerably larger than the expected input object.

Figure 6:
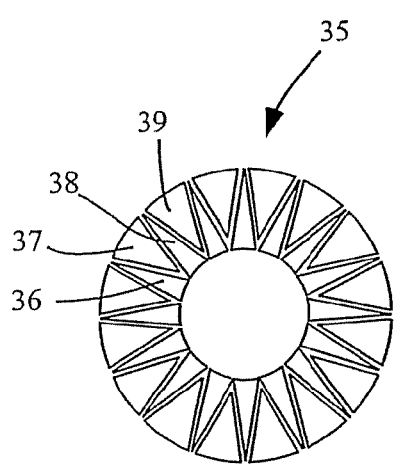
FIG. 6 illustrates triangle-shaped electrodes of a closed-loop sensor.

Another example is a closed-loop sensor 35 having triangle-shaped electrodes, as illustrated in FIG. 6. In this case, the odd-numbered triangle-shaped electrodes (e.g. 37, 39) are wider toward the outer edge of the closed-loop area and narrower toward the inner edge of the closed-loop area, while the even-numbered triangle-shaped electrodes (e.g. 36, 38) have the opposite positioning. To compute the input object's angular position around the closed-loop sensor, the same interpolation algorithm used for other closed-loop sensors can be used. As long as the input object is wide enough to cover at least two even-numbered electrodes (e.g., 36, 38) and at least two odd-numbered electrodes (e.g., 37, 39), interpolation to calculate position along the loop will mostly compensate for the difference in the shapes of the even electrodes versus odd electrodes. To compute the input objects radial position, or position between the inner and outer edges of the closed-loop sensor area, the total capacitance $C_{EVEN}$ on the even-numbered electrodes and similarly the total capacitance $C_{ODD}$ of the odd-numbered electrodes should be calculated. The radial position is given by $C_{ODD}/(C_{EVEN}+C_{ODD})$. If only radial information is desired of the closed-loop sensor, then only two distinct electrode sets are needed—all of the odd-numbered electrodes can be electrically connected or wired together, and all of the even-numbered electrodes can be electrically connected or wired together. The triangle design is also self-interpolating in the radial position in that the odd-number electrodes (e.g., 37, 39) will naturally increase in signal and the even-number electrodes (e.g. 36, 38) will naturally decrease in signal, when the input object moves from the inner edge of the closed-loop sensor towards the outer edge of the closed-loop sensor; these natural effects facilitate determination of the radial position.

As shown in FIG. 6, the odd-number electrodes (e.g., 37, 39) are larger in area than the even-number electrodes (e.g., 36, 38). This means that the odd-number electrodes (e.g., 37, 39) may produce a larger signal than the even-number electrodes (e.g., 36, 38) in response to the same type of input and cause the simple $C_{ODD}/(C_{EVEN}+C_{ODD})$ calculation of radial position to favor the outer edge. There are many ways to prevent the closed-loop sensor 35 from biasing toward the outer edge when calculating radial position. For example, the signals from either the odd-number electrodes (e.g., 37, 39), or the even-number electrodes (e.g., 36, 38), or both, can be scaled based on size prior to calculating radial position, or the radial position produced can be adjusted based on electrode sizes. This unbalanced signal effect is due to having to accommodate the circular shape of closed-loop sensor 35; for example, a linear sensor with triangular electrodes can easily have equally sized triangular electrodes.

Figure 7:
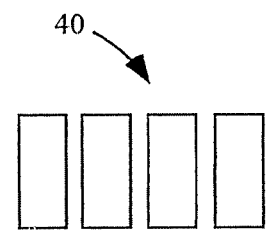
FIG. 7 illustrates rectangular-shaped electrodes that may be used in a linear section of a closed-loop sensor.
Figure 8:
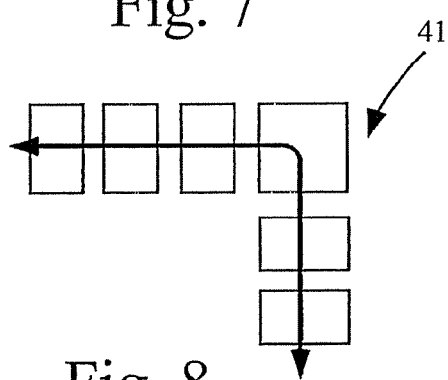
FIG. 8 illustrates rectangular-shaped electrodes that may be used in a rectangular-shaped closed-loop sensor.
Figure 9:
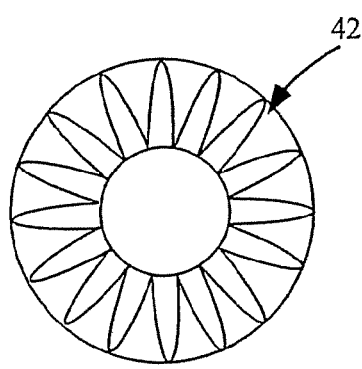
FIG. 9 illustrates another example of triangle-shaped electrodes of a closed-loop sensor.
Figure 10:
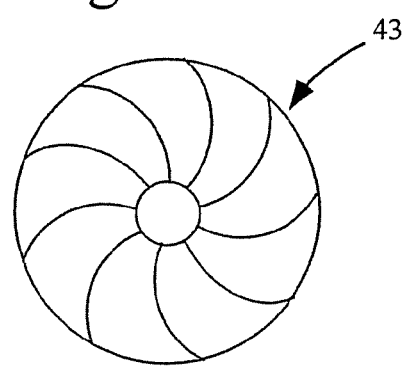
FIG. 10 illustrates spiral-shaped electrodes of a closed-loop sensor.

Rectangle-shaped electrodes 40, 41 can also be utilized, as illustrated in FIGS. 7 and 8, respectively. Another example is a closed-loop sensor 42 having triangle-shaped electrodes that are rounded, similar to petals of a flower, as illustrated in FIG. 9. The design shown in FIG. 9 is a method of reducing the unbalanced signal effect described above by adjusting the triangle electrodes such that all of the electrodes are similar in size. Another example of electrode shapes is shown by a closed-loop sensor 43 having spiral-shaped electrodes, as illustrated in FIG. 10.

The closed-loop sensor generally utilizes sensor electrodes arranged along the shape of a closed, or substantially closed, path (or loop). Several shapes may be used, although a circular path is preferred. FIGS. 11 to 17 illustrate various shapes contemplated. The shapes contemplated include a circle, an oval, a triangle, a square, a rectangle, an ellipse, a convex or concave polygon, a figure eight, a spiral, a complex maze-like path, and the like. Other more complex paths are possible and might be more desirable or more appropriate in some situations. In addition, the loop sensor can also be nonplanar; for example, it may be arranged on the surface of a cylinder, a cone, a sphere, or other 3-D surface. Also, the loop path may be defined for input objects of various sizes, perhaps as small as a pen tip and as large as a hand.

It is desirable to communicate a definition of the loop path to the user. There are several means possible to define the path of the closed-loop sensor including tactile guides and physical constraints. As illustrated in FIGS. 18 and 20, a physical constraint in the form of a depressed groove can be used to define the path on the closed-loop sensor. The depressed groove can be U-shaped 46, V-shaped 44, or some other cross-sectional shape. FIG. 19 illustrates the use of a physical constraint in the form of a raised ridge 45, while FIG. 21 illustrates the use of a physical constraint in the form of a bezel 48 to define the path on the closed-loop sensor. Other tactile options are also contemplated, including a depressed region, a cutout, a textured region, a tactile label (such as a label with embossing, stamping, or raised printing), a rounded protrusion, and the like. The path can also be indicated in a non-tactile manner, such as by LCD projections, non-tactile graphics printed on a label covering the sensor or on the sensor housing, or a display associated with a transparent closed-loop sensor. A tactile guide is preferred when practiced.

There are distinct advantages of having a tactile guide that help retain the input object along the closed-loop path. Without such a guide, the input object tends to stray as the user cannot track the loop perfectly, and especially as the user shifts attention between keeping the input object within the loop and monitoring the resulting actions in response to input along the loop. Even with methods to try to compensate for the deviation from the defined loop (as discussed further herein), the resulting interface is not as user friendly or as amenable to user control as a guide that help retain the input object. There are distinct advantages to marking the loop path appropriately for the expected input object. For example, if a finger is utilized, a groove designed to retain and guide the finger can be used. If a stylus is utilized, a smaller groove can be used to retain the stylus. If a hand is utilized, a larger groove can be used.

Multiple closed paths can be defined on a single input device, each of which controls different features of the user interface. In this case, it is especially desirable to make the location of each loop path readily apparent to the user by use of one of the above-mentioned means, such as a bezel with multiple openings.

There are many ways of decoding the user's position along the path. The hardware of the sensor may be designed, for example, with the loop path physically laid out in such a way that the only coordinate reported to the host computer is already in the desired form.

Alternately, for some loop paths, X/Y coordinates on a traditional two-dimensional sensor can be converted into polar coordinates (with the origin preferably located in the center of the loop) and the angle component used as the user's position. Multiple closed loops can be defined on a single two-dimensional position detector and resolved by calculating multiple sets of polar coordinates with different origins and choosing the closed loop yielding the smallest radial coordinate. More complicated path-based decoding can also be performed by dividing the path into geometrically simpler regions, and using various methods designed to determine which region contains an input.

Once the user's position on the loop path is determined using above-referenced methods, this information can be used in many ways. Successive user locations can be subtracted to decode motion direction or magnitude. This motion can, for example, be converted into scrolling signals or keystrokes that the user interface can interpret.

In a preferred embodiment, this user motion is only interpreted in a relative manner. That is, the absolute position of the input object in the loop path is insignificant. This can be advantageous because it frees the user from having to target an exact starting position along the loop. However, it may occasionally be useful to use this absolute position (i.e., an exact starting point), for example, to indicate a starting value for a controlled parameter or to indicate the desired parameter to be varied.

One of the user interface problems that can benefit from the present invention is scrolling. To solve the scrolling problem, the motion of the user's position on the closed-loop sensor is converted to signals (or instructions) that would cause the user interface to scroll the currently viewed data in the corresponding direction. FIGS. 22 and 23 illustrate the motions (illustrated by arrow 50) of an input object on a closed-loop sensor of an object position detector 52 and the effect on a host device. For the purposes of this disclosure, numeral 52 represents an object position detector. As disclosed herein, the object position detector could be any shape.

As the input object moves on the closed loop sensor of the object position detector 52, a document on a computer screen 54, for example, is scrolled either up or down depending upon the direction of the movement of the input object. For example, in the case of FIG. 22, the counterclockwise motion shown by arrow 50 can cause the document 54 to be scrolled up as indicated by arrow 56, while FIG. 23 illustrates the scrolling of the document down as indicated by arrow 58 with a clockwise motion (shown by arrow 50) on the closed-loop sensor of the object position detector 52.

Figure 24:
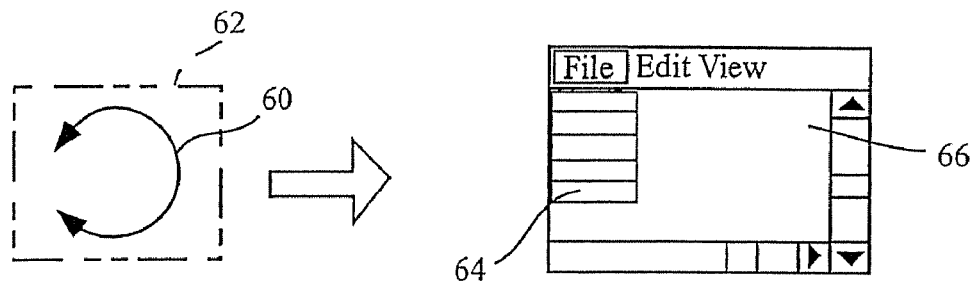
FIG. 24 illustrates a motion on a closed-loop sensor for navigating menus.

Navigating through menus is also easier with the present invention. As illustrated in FIG. 24, a motion either clockwise or counterclockwise (illustrated by arrow 60), on the closed-loop sensor of the object position detector 62 would cause the drop down of menu items 64 on, for example, a computer screen 66. For the purposes of this disclosure, numeral 62 represents an object position detector. As disclosed herein, the object position detector could be any shape. The simplest instance of this is to convert the relative position signal (or instruction) in such a way that the menu is navigated depth-first by sending keystrokes or other messages understood by the graphical user interface (GUI) to indicate intent to navigate a menu. One alternative solution for complex menus is to traverse only the current menu hierarchy level by using the loop method of the closed-loop sensor, and a separate mechanism to switch between levels in the menu. There are many applicable mechanisms, including physical switches that the user presses, regions on the sensor where the user can tap or draw a suggestive gesture, and the like.

It is possible to overload the user interface element controlled by the closed-loop sensor using physical or virtual "shift" keys or switches, which is similar to the way that the shift key on a keyboard overloads the meaning of the keys. For example, the system can be configured so that unmodified traversal along the path would control scrolling of the current application, but modified traversal by holding down a keyboard's "shift" key can control the volume setting of the audio output. This can be accomplished with a single sensor by way of mode switching, or by multiple sensors or regions of a single sensor, as will be illustrated further herein.

Figure 25:
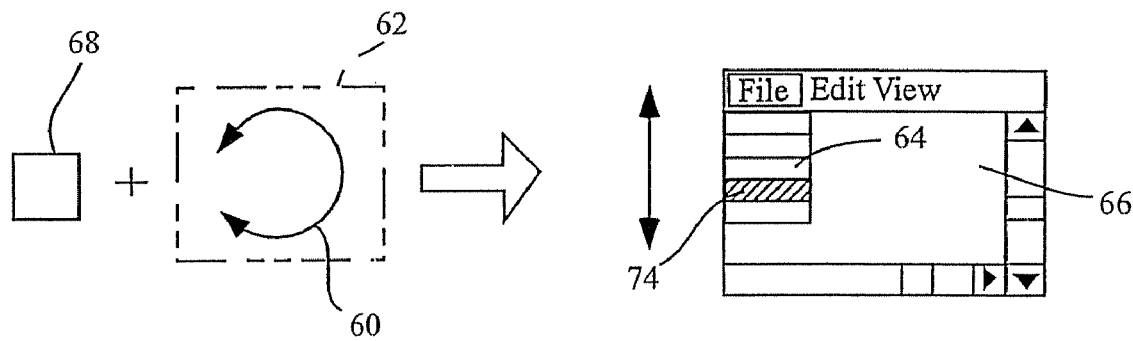
FIG. 25 illustrates a motion on a closed-loop sensor for vertically navigating menus using an additional key.
Figure 26:
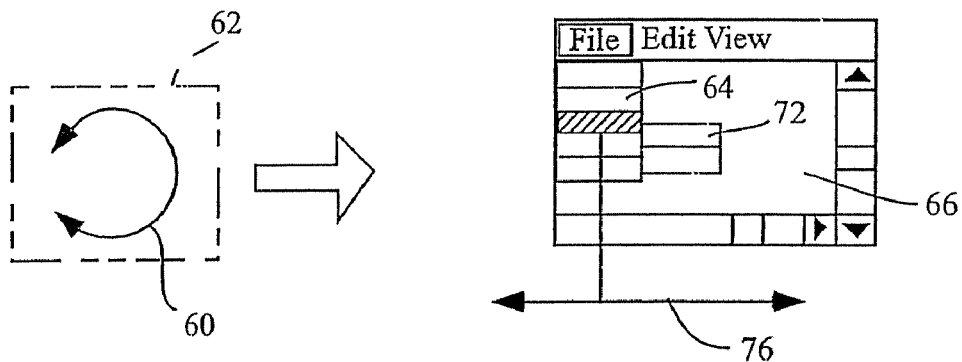
FIG. 26 illustrates a motion on a closed-loop sensor for horizontally navigating within open menus.

This mode switching means, such as a "shift key" or other appropriate key, can cause input on the closed-loop sensor of the object position detector 62 to traverse the menu hierarchy orthogonal to the current level. FIG. 25 illustrates the activation of a "shift" key 68 combined with a motion (illustrated by arrow 60) on the closed-loop sensor of the object position detector 62 to move through the menu items 64 on, for example, a computer screen 66. FIG. 25 illustrates the vertical movement (illustrated by arrow 74) through menus with the shift key 68 activated, while FIG. 26 illustrates the horizontal movement (illustrated by arrow 76) through horizontal menu items 72 with the shift key unactivated. It is also possible to reverse the function of shift key 68, such that not depressing shift key 68 results in vertical motion through the menu items 64, while depressing shift key 68 results in horizontal movement between menu layers.

The closed-loop sensor of the object position detector 62 also addresses the "deep menu" problem by enabling the menu to be presented in flatter form on the computer screen 66. Studies have shown that humans are capable of using, and may even prefer to use, menus in which the submenus are displayed in indented form (not shown). However, users have traditionally had trouble with such menus since maneuvering down such a list may require fine steering control of the cursor or multiple scrolling motions. The present invention, which allows infinite scrolling along a menu, enables the deeper menu to be presented as a longer list, and the depth of the menu reduced.

Figure 27:
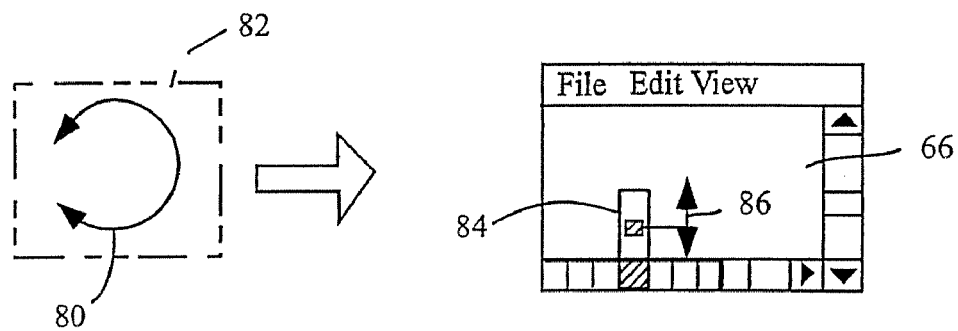
FIG. 27 illustrates a motion on a closed-loop sensor for a value setting control.

A value setting control, such as a "spin control" or slider, can be varied according to the user's input on a closed-loop sensor in a similar manner by sending keystrokes or other messages understood by the user interface as indicating an attempt by the user to increment or decrement the value of the control. FIG. 27 illustrates an example of a value setting control that controls the volume settings. As illustrated in FIG. 27, a motion, either clockwise or counterclockwise, (illustrated by arrow 80) on the closed-loop sensor of the object position detector 82 would cause the setting of the volume control 84 to either increase or decrease (as indicated by arrow 86) on, for example, a computer screen 66. For the purposes of this disclosure, numeral 82 represents an object position detector. As disclosed herein, the object position detector could be any shape.

For two-dimensional and three-dimensional graphical presentations, such as computer aided drafting (CAD), solid modeling, or data visualization, the relative motion of the user's input on the closed-loop sensor can be converted by the software directly into translation, rotation, and/or scaling of the model or viewport.

Many user interface elements can benefit from the closed-loop sensor. Most can be categorized as being similar to controls for scrolling, menus, or value setting controls. For example, selection among icons on a "desktop" can be performed using this method, with a means (such as a gesture on the sensor, a tap on the sensor, a button, or a key) provided for launching the corresponding program once the user is satisfied with the selection. This task can be considered analogous to navigating a menu.

Navigation along the "tab order" of the elements of a graphical user interface can be performed with a closed-loop sensor. Similarly, navigation between multiple running applications, multiple documents edited by the current application, or multiple modes of a particular application can be accomplished with this control.

As an alternative to a separate sensor with a defined path, a special mode can be implemented on an existing touch pad-style pointing device to perform the same function as the closed-loop sensor of the present disclosure. For example, a touch pad of a notebook computer is primarily used for moving a pointer and selecting elements in the user interface. A button, switch, or mode changing tap region on the touch pad can be defined to change the mode of the touch pad so that it operates as a loop-scrolling device. The user would activate this mode-switching control, and then move in an approximately closed loop path, preferably circular, on the touch pad. While this mode is selected, this motion is interpreted as a scrolling action rather than as the typical pointing action.

Another mode switching method is possible if the closed-loop sensor can distinguish the number of input objects present. Moving in a circle with two input objects (both input objects moving in the same direction, as opposed to when the input objects move in opposite directions or when one of the input objects does not move significantly) on the closed-loop sensor, for example, can scroll through a set of data, while moving a single input object can be interpreted as a pointing action. Due to the flexible nature of the closed-loop sensor, other usage modalities are possible in combination with this fundamental mode of operation.

Figure 28:
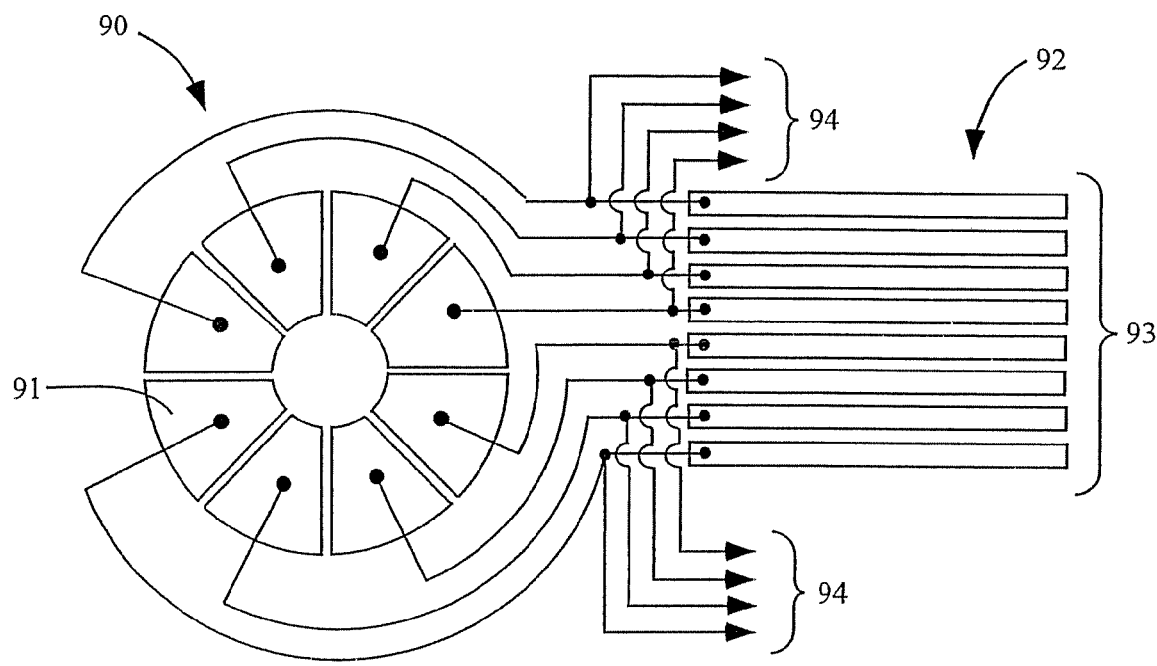
FIG. 28 illustrates a closed-loop sensor electrically connected to a touch pad.

As stated above, the closed-loop sensor can also share the resources of a separate touch pad or touch sensor. FIG. 28 illustrates the electrical leads 94 connecting the closed-loop sensor electrodes 91 of a closed-loop sensor 90 with Y axis electrodes 93 (eight are illustrated) of a touch pad 92. For the purposes of this disclosure, numeral 90 represents an exemplary closed-loop sensor and numeral 92 represents an exemplary touch pad. One skilled in the art would recognize that the touch pad 92 could be any shape, design or configuration. The X axis electrodes of touch pad 92 are not shown. The leads 94 transmit signals from the Y axis electrodes 93 or the closed-loop sensor electrodes 91, or both, to the Y axis sensor inputs (not shown) of the processor (not shown). Additional leads (not shown) connect the X axis electrodes (not shown) to the X axis sensor inputs (not shown). When an input object touches the touch pad 92, the input results in changes in the signals of both the Y sensor inputs and the X sensor inputs. In contrast, when an input object touches the closed-loop sensor 90, the input is read by the electrodes as changes in the Y sensor inputs only. By checking if the X axis signals have changed, the host system can distinguish between user input on the touch pad 92 and the closed loop sensor 90. If desired, the X sensor inputs can be connected to the closed-loop sensor instead of the Y sensor inputs. Alternatively, additional closed-loop sensors can also be disposed and electrically connected to the X sensor inputs of the touch pad.

Figure 29:
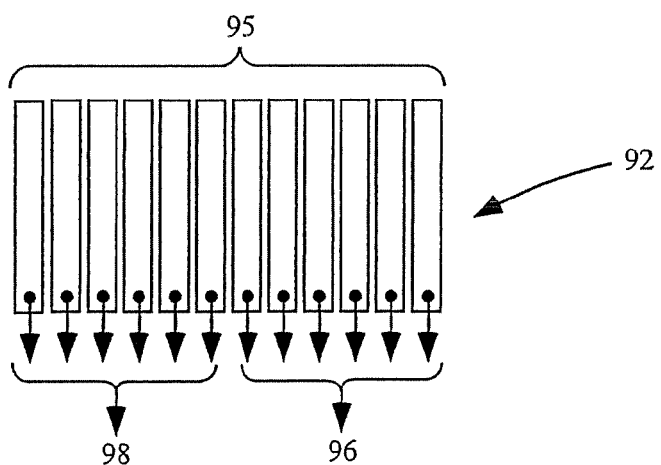
FIG. 29 illustrates the potential electrical connections of two closed-loop sensors to a touch pad.

As illustrated in FIG. 29, one axis of electrodes 95 of a touch pad 92 can support more than one closed-loop sensor. Arrow 96 indicates the potential positioning of leads to a first closed-loop sensor that has six distinct electrodes, while arrow 98 indicates the potential positioning of leads to a second closed-loop sensor.

Figure 30:
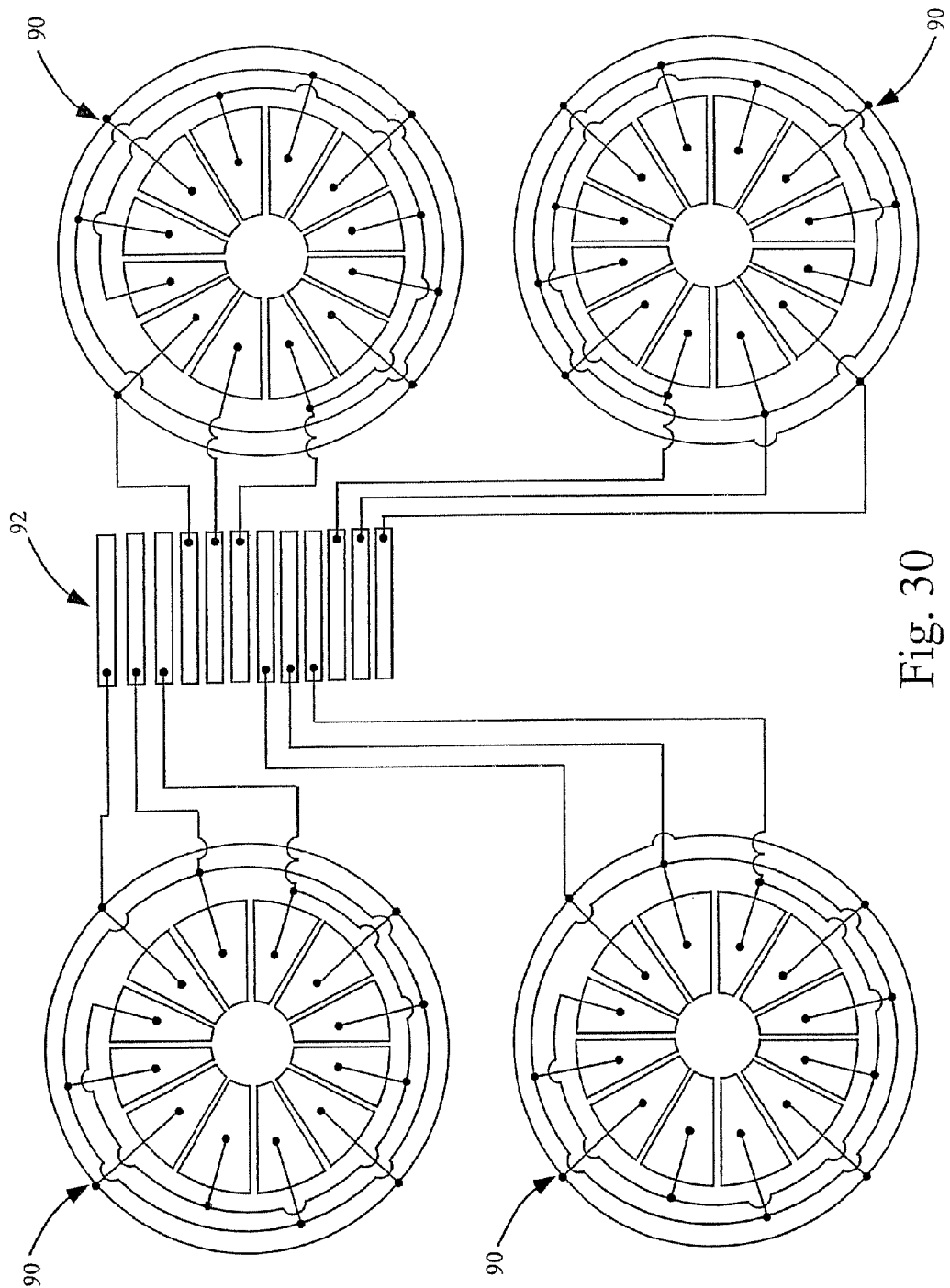
FIG. 30 illustrates several closed-loop sensors electrically connected to a touch pad.

FIG. 30 illustrates the ability to have several closed-loop sensors 90 working in conjunction with a touch pad 92. The leads connecting the electrodes of four separate closed-loop sensors 90 to the electrodes of a single touch pad 92 are illustrated. As shown by closed-loop sensors 90, if absolute position information is not necessary, and only relative motion is needed, the electrodes of the closed-loop sensor can be laid out as repeating patterns of subsets of three or more sensor electrodes. When the same subsets are repeated multiple times in each closed-loop sensor, the sensor signals cannot be used to determine which of the subsets is interacting with the input object. However, the position of the input object can be determined within the subset and, if the subset is large enough such that the input object will not move beyond the subset before the next data sample is taken, relative position of the input object can be determined between consecutive positions and compared to calculate motion of the input object.

Repeated subsets of electrodes are especially useful if the closed-loop sensor is large, since each electrode in the repeated pattern can remain small to retain adequate resolution without increasing the complexity of sensor circuitry significantly. Repeated subsets are also useful if fine resolution is needed as many more sensor electrodes can be put in a small distance to increase the resolution without increasing the complexity of sensor circuitry. Repeated electrodes are also useful if it is desirable to control many relative position closed-loop sensors with a single integrated circuit, because it reduces the number of distinct sensor inputs (or input lines) that need to be supported in the circuit. Additional methods can be used to further decrease the number of distinct sensor inputs, such as multiplexing the sensing circuitry across multiple sensor electrodes.

Figure 31:
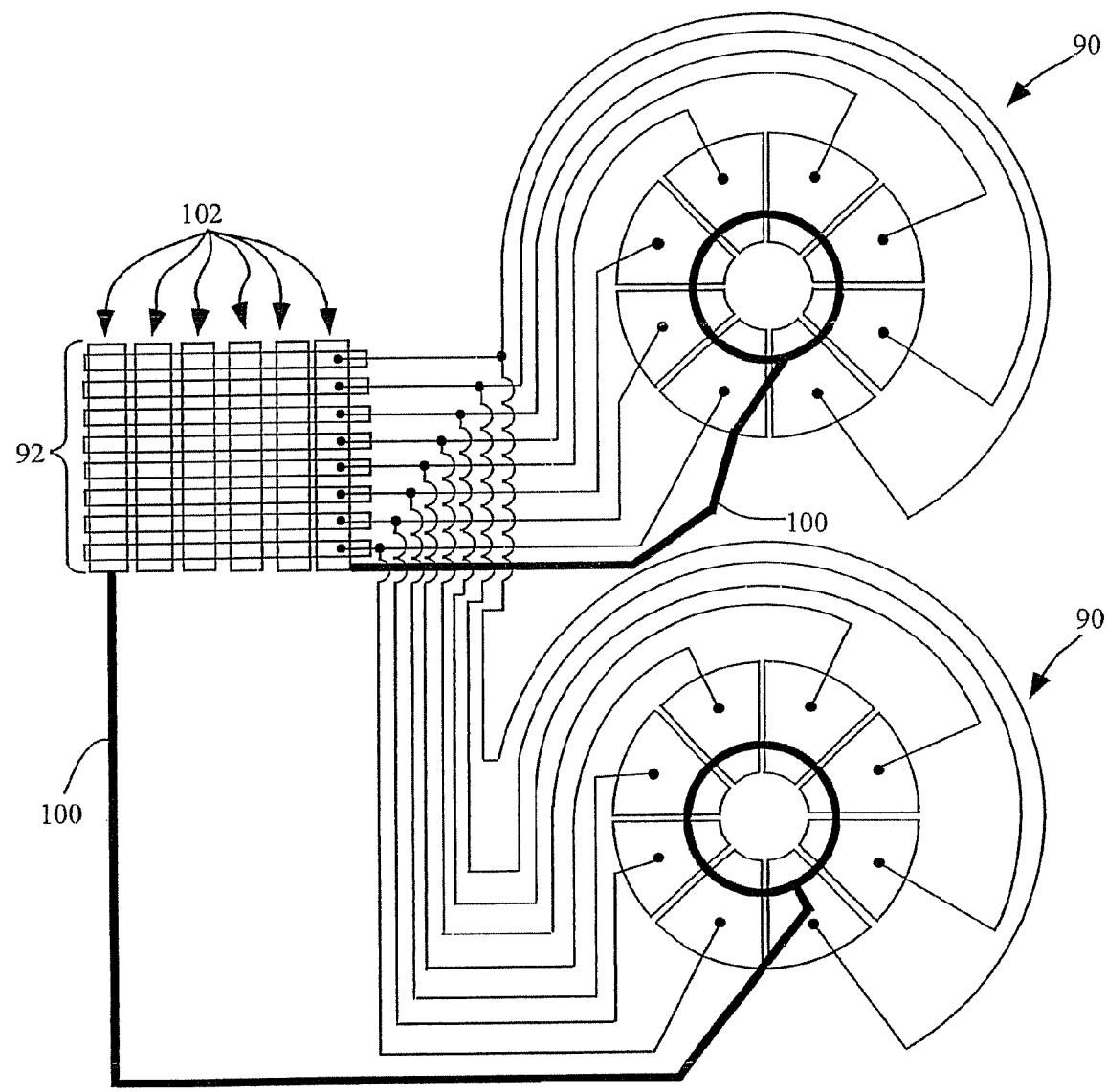
FIG. 31 illustrates two closed-loop sensors with indicator electrodes electrically connected to a touch pad.

FIG. 31 illustrates another way that one Cartesian touch pad can be used to control a plurality of closed-loop sensors. Each of the closed-loop sensors can be linked to the same set of sensor inputs that is associated with the first axis of the Cartesian touch pad. Thus, the corresponding electrodes on each closed-loop sensor will be linked to the same sensor input. Each of the closed-loop sensors can also be linked to distinct ones of the electrodes of the second axis of the Cartesian touch pad. This can be accomplished by running a separate "indicator" sense electrode along the loop path of each closed-loop sensor and linking these indicator electrodes to distinct sensor inputs on the second axis. The indicator electrode can be located anywhere near the closed loop, and of any shape, as long as it will indicate user input when the user interacts with the relevant closed loop.

With indicator electrodes linked to the sensor inputs of the second axis of the Cartesian touch pad, if the signals from the sensor inputs of the second axis are similar to that expected when the Cartesian touch pad is being used, then the host device can determine that the Cartesian touch pad is being used. For example, an input object on a typical capacitive touch pad causes the capacitance registered by the sensor inputs to change in a characteristic manner; the sensor inputs associated with the electrodes closest to the input object indicate the greatest change in capacitance; the sensor inputs associated with electrodes further from the input object indicate smaller changes in capacitance; the sensor inputs associated with electrodes furthest from the input object indicate the smallest changes.

Thus, the configuration above in which indicator electrodes are linked to the second axis can indicate when a closed-loop sensor is being used. For example, a user placing an input object on a closed-loop sensor with an indicator electrode coupled to a touch pad will cause the sensor input associated with the indicator electrode to indicate a large change in capacitance. However, the input object will not cause the sensor inputs associated with adjacent electrodes of the second axis to vary in the characteristic pattern described above that is associated with an input object on the touch pad. Thus, the host device can determine that a closed-loop sensor is being used and act accordingly. In one embodiment, the indicator electrodes are laid out and shielded such that minimal capacitive coupling occurs between the input object and the indicator electrodes of the closed-loop sensors not being touched by the input object; with this embodiment, significant signal on the sensor inputs of the second axis comes from only the sensor input associated with the indicator electrode of the closed-loop sensor being touched, and negligible signal comes on the other sensor inputs of the second axis. Signals from the first axis would indicate position and motion on the closed-loop sensor, while signals from the second axis would indicate which closed-loop sensor is being used.

Figure 32:
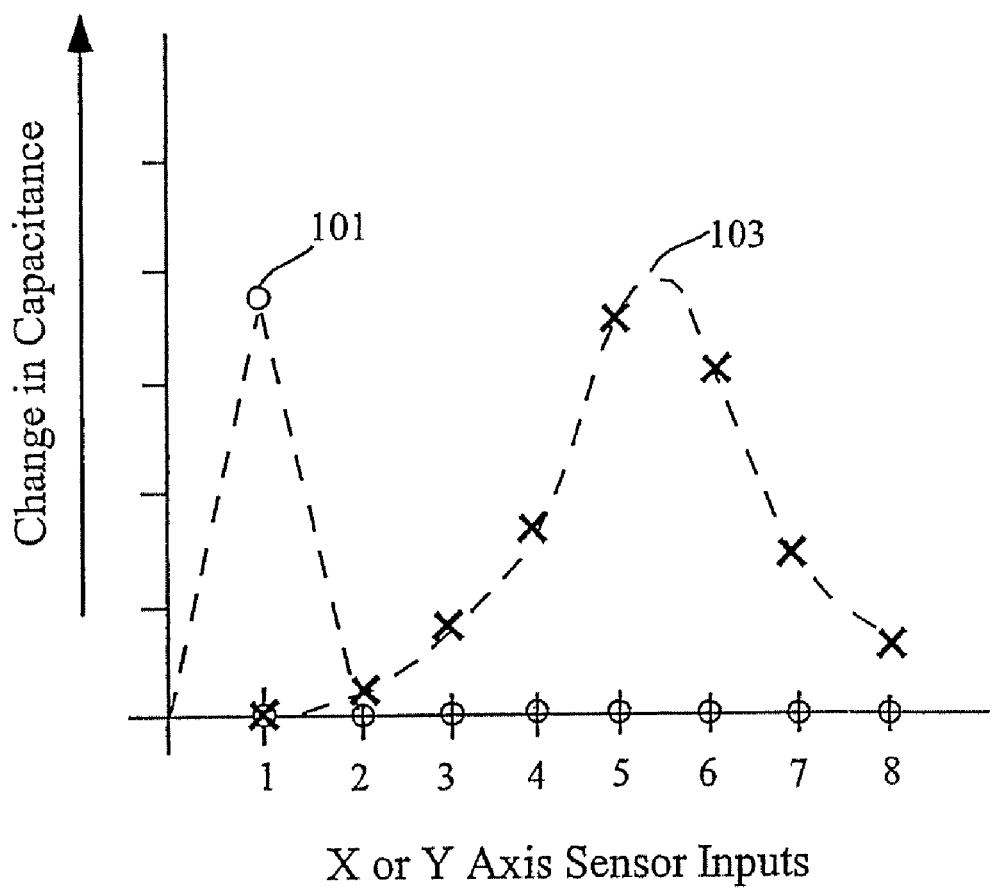
FIG. 32 illustrates a graph of the signals from a closed-loop sensor with an indicator electrode electrically connected to a touch pad.

FIG. 31 illustrates two closed-loop sensors 90 electrically connected with a touch pad 92. When an input object touches the touch pad 92, the input is read by the sensor inputs as changes in adjacent ones of second axis sensor inputs (demarked by x's and represented by numeral 103 in FIG. 32). In contrast, when an input object touches the closed-loop sensor 90, the input is read as changes (demarked by o's and represented by numeral 101 in FIG. 32) in the sensor input associated with indicator electrode 100 (represented by sensor input 1 in FIG. 32). This enables the processor (not shown) to determine which device is being utilized for the present function. Although two closed-loop sensors 90 are illustrated, several other closed-loop sensors may also be connected to the touch pad 92 and can also have indicator electrodes. These indicator electrodes may be connected at any one of the positions illustrated by arrows 102.

In another embodiment, control electronics designed for a Cartesian touch pad can be used in the manner of FIG. 31, but without an actual touch pad sensor, as a simple cost-effective way to implement a collection of closed-loop sensors.

In the case that multiple closed-loop sensors are being operated at once, or closed-loop sensors and the touch pad are being operated simultaneously, the characteristic signal shape (such as spikes of large changes in capacitance on some sensor inputs and not others) can be used to indicate which closed-loop sensors are being used and the signals can be decomposed appropriately. In cases where the host device cannot determine which sensors are being used, then another indication of which sensors are used can be indicated through key presses, button clicks, gestures on the touch pad, or other input. This would enable the host device to extract useful information about which sensor is being touched from the superimposed signals, or the system can use this information to reject simultaneous input on multiple sensors.

In addition to using indicator loop electrodes, multiplexing inputs and outputs in time can also be used to determine which of a plurality of closed-loop sensors have caused an input. Other methods of multiplexing over time or over separate sensor inputs and driving circuitry are also viable.

The present invention can have an inactive region in the center of the loop path that comprises a protrusion, a depression, or a surface in the same plane as the sensor. Alternatively, the closed-loop sensor can also have a physical button, or multiple buttons, in the center. The closed-loop sensor can have a hole for a physical button in the center or the center can be one or more touch sensitive zones (or activation zones), which can also be used to emulate one or more buttons. The closed-loop sensor can have a pointing stick, track ball, small touch pad, or other input device in the center. The closed-loop sensor can have one or more physical buttons beneath it that are activated by pressing on the closed-loop sensor.

Figure 33:
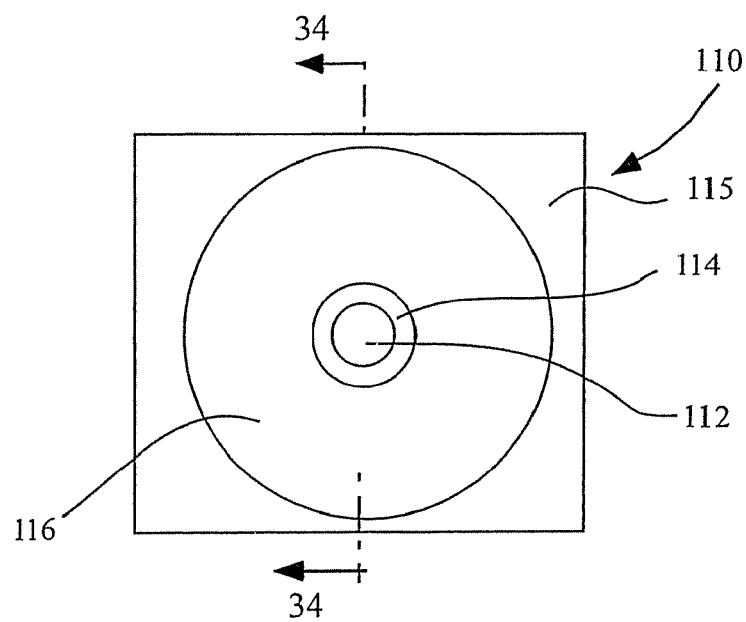
FIG. 33 illustrates a top view of an exemplary closed-loop sensor.
Figure 34:
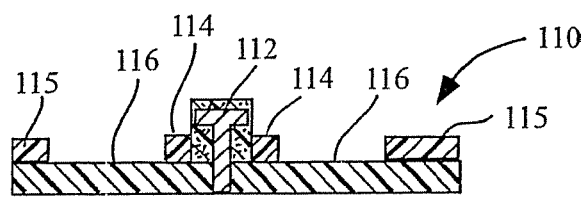
FIG. 34 illustrates a side view of the cross-section of the exemplary closed-loop sensor of FIG. 33.

FIG. 33 illustrates a top view of an exemplary closed-loop sensor 110 having a pointing stick 112 disposed in the center of a bezel of the closed-loop sensor 110. For the purposes of this disclosure, numeral 112 represents an exemplary pointing stick. One skilled in the art would recognize that the pointing stick 112 could be any shape, design or configuration. FIG. 34 illustrates a side view of the cross-section of the closed-loop sensor 110. The pointing stick 112 is disposed in the center of the closed-loop sensor 110 surrounded by an interior portion 114 of the bezel. The loop path 116 is defined by interior portion 114 and also by an exterior portion 115 of the bezel. In one application of the arrangement in FIG. 33, pointing stick 112 can serve as the pointing device for a laptop computer, and the closed-loop sensor 110 can serve as the scrolling device.

Figure 35:
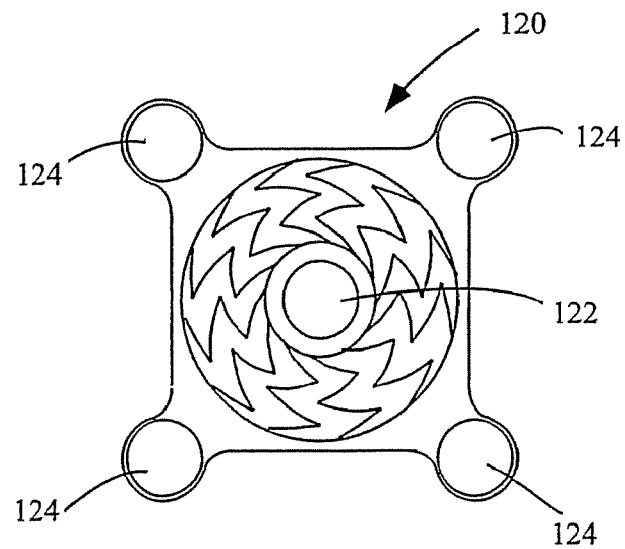
FIG. 35 illustrates the lightning-bolt-shaped electrodes of an exemplary closed-loop sensor having an interior opening and four exterior regions.

FIG. 35 illustrates the lightning-bolt design sensor 120 having an interior opening 122 for the installation of, for example, a pointing stick, and four exterior regions 124 that can be touch sensitive zones (or activation zones) that emulate buttons. If desired, the touch sensitive zones can also be used to estimate pressure of contact if the input object is similar to a finger in its tendency to spread out and cover a greater area of the sensor with increased contact pressure. This additional information can be used to increase the functionality of the sensor. The closed-loop sensor can detect taps, presses, and other gestures, which can be used to control general-purpose input/output (GPIO) pins or reported in a data packet.

Multiple closed-loop sensors can be implemented as a set of nested closed-loop sensors defined on a single position detector, or on multiple position detectors, with each closed-loop sensor controlling a different feature of the user interface. Determining the angular $\theta$ position of the input object in such a set of nested closed-loop sensors is the same as in determining the angular $\theta$ position of the input object in a single closed-loop sensor. These nested closed-loop sensors can act as independent input devices. They can also be used together as parts of one control—such as in a vernier-type control in which outer loops are associated with coarser control and inner loops are associated with finer adjustment. Nested closed-loop sensors can also be used together to generate a one-and-a-half dimensional or a two-dimensional input device. For example, a set of nested closed-loop sensor can be formed from a concentric set of circular closed-loop sensors having varying radii. In the one-and-a-half dimensional version, the position detector monitors which closed-loop sensor has the strongest input signal to make a gross estimate of the input object position.

In the two-dimensional version, signals from the set of nested closed-loop sensors are interpolated to more accurately generate a radial r position of the input object. Algorithms similar to those used to calculate linear coordinates can be used for calculating the radial r coordinates. Depending on the design of the radial sensor electrodes, scaling or weighting of individual electrode signals may be necessary to accommodate for the larger or more numerous sensor electrodes in the loops farther away from the center of the nested sensors. However, after such scaling (if necessary), conventional methods for interpolation to estimate position and for estimating motion can be used. Since the radial r position is known to a finer resolution than the number of concentric closed-loop sensors in the set of nested sensors, the r information can be used to enable the set of nested sensors to emulate more closed-loop sensors than the actual number of closed-loop sensors physically in the nested set. The preceding applications of buttons, keys, pointing sticks, touch screens, touch sensitive zones, and the like, with a single closed-loop sensor can also be applied to a position detector having multiple closed-loop sensors.

Figure 36:
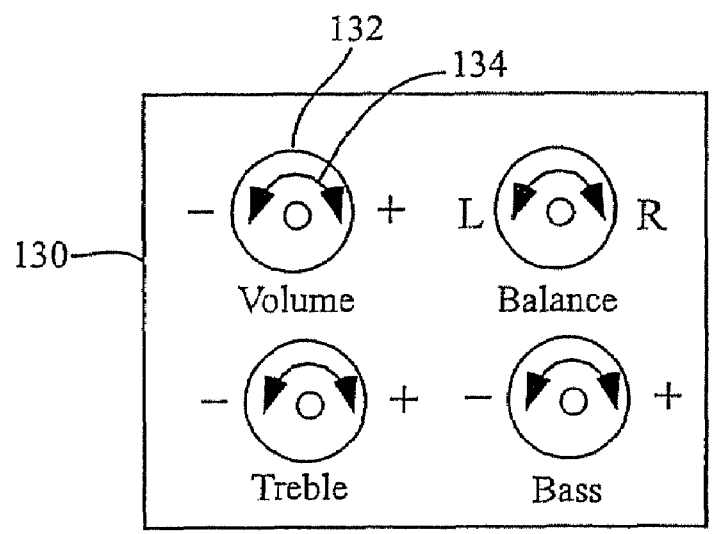
FIG. 36 illustrates a plurality of closed-loop sensors to vary the settings of audio controls.

FIG. 36 illustrates an object position detector 130 having four closed-loop sensors to vary the settings of audio controls. Although four separate closed-loop sensors are shown, any number of closed-loop sensors can be utilized. Using the volume control closed-loop sensor 132 as an example, the motions (illustrated by arrow 134) of an input object on the volume control closed-loop sensor 132 will cause the volume of the audio system to either increase or decrease. Likewise, other closed-loop sensors on object position detector 130 can be used for balance and the levels of treble and bass for an audio system.

Figure 37:
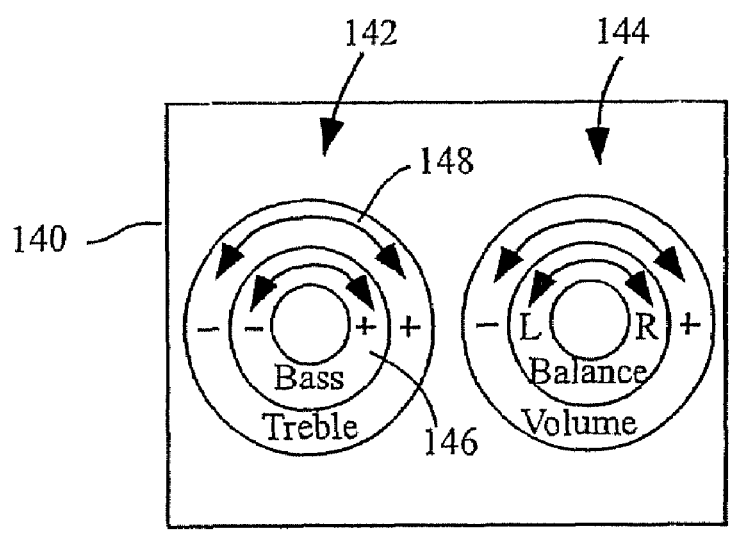
FIG. 37 illustrates two sets of two closed-loop sensors formed concentrically about a single origin for an audio system.

The multiple closed-loop system can be applied in alternative ways. FIG. 37 illustrates another object position detector 140 for an audio system having two sets of nested sensors (142 and 144) consisting of concentric circles of two closed-loop sensors. Each of the two sets of nested sensors (142 and 144) has separate closed-loop sensors to control separate functions for the audio system. For example, nested set of sensors 142 has a first closed-loop sensor 146 for bass and a second closed-loop sensor 148 for treble. Other nested closed-loop sensor shapes are contemplated in addition to concentric circles.

Figure 38:
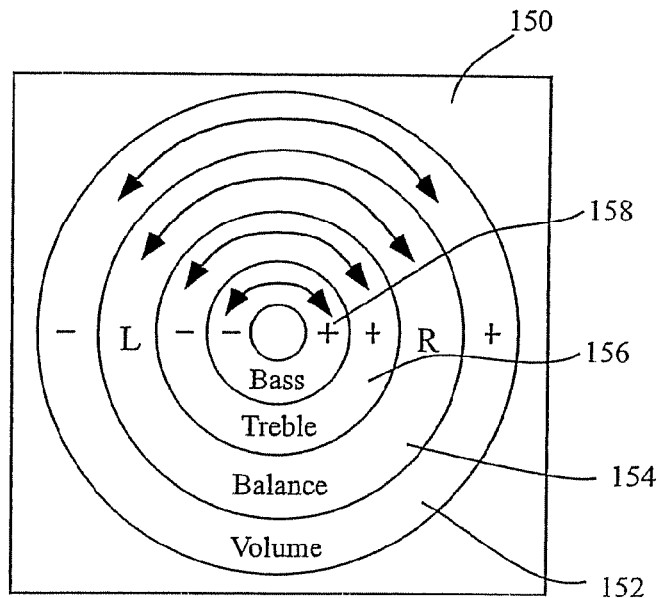
FIG. 38 illustrates four closed-loop sensors for an audio system formed in concentric circles about a single origin.

Another alternative multiple closed-loop system is an object position detector 150 for an audio system having four closed-loop sensors disposed in concentric circles (or other appropriate shapes) as illustrated in FIG. 38. The four separate closed-loop sensors each control a separate function in the audio system. For example, closed-loop sensor 152 controls volume, closed-loop sensor 154 controls balance, closed-loop sensor 156 controls treble, and closed-loop sensor 158 controls bass.

Position algorithms can be used to calculate the position along a closed loop, which can be expressed as angular coordinates for roughly circular closed-loop sensor designs, of an input object, including a quadratic fitting method, a centroid interpolation method, a trigonometric weighting method, and a quasi-trigonometric weighting method. When the closed-loop sensor is implemented as a capacitive sensor, the capacitance measurements from the sensor electrodes are preferably combined using an interpolation algorithm for greater precision.

Figure 39:
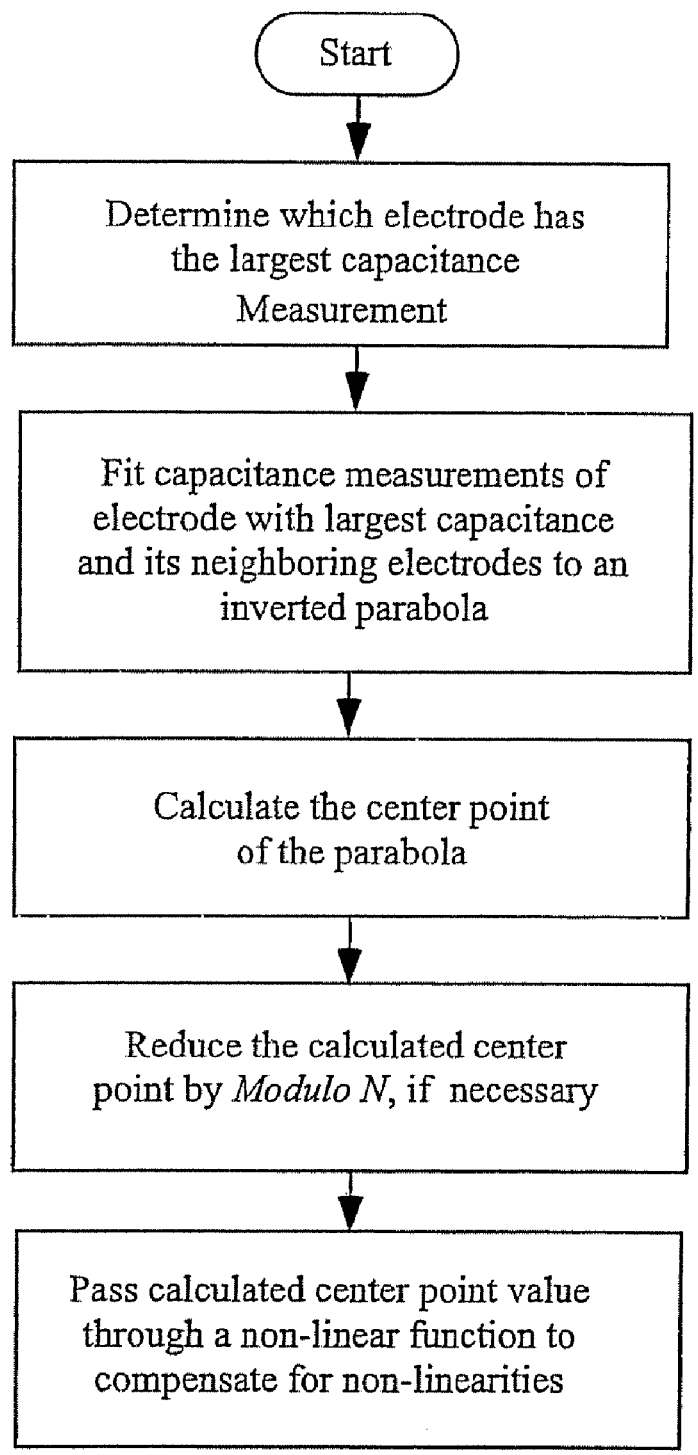
FIG. 39 is a flow chart of a method of calculating a position of an object on a closed-loop sensor by performing a quadratic fitting algorithm.

A preferred interpolation method is quadratic fitting, as illustrated in FIG. 39. This method typically involves three steps. In the first "peak detection" step, the electrode with largest capacitance measurement is determined to be electrode number i, where the N electrodes are numbered from 0 to N−1. The number i is an initial, coarse estimate of the input object position. The capacitance measurements are normally made against a non-zero background capacitance on each electrode. This background (no input object) capacitance arises from a number of factors such as chip pin capacitance and circuit board ground plane capacitance. Many of these effects vary from sensor to sensor and vary over time, so it is preferable to use a dynamic calibration algorithm to subtract out the baseline. First, the capacitances C'(j) of all the electrodes 0≦j<N are measured at a time when no input object is present; and stored in a table $C_0(j)$. Then, when an input object is present, the electrode input object capacitance measurement, C(j), is preferably computed from the capacitances of all of the electrodes C'(j) as C(j)=C'(j)−$C_0$(j).

Figure 40:
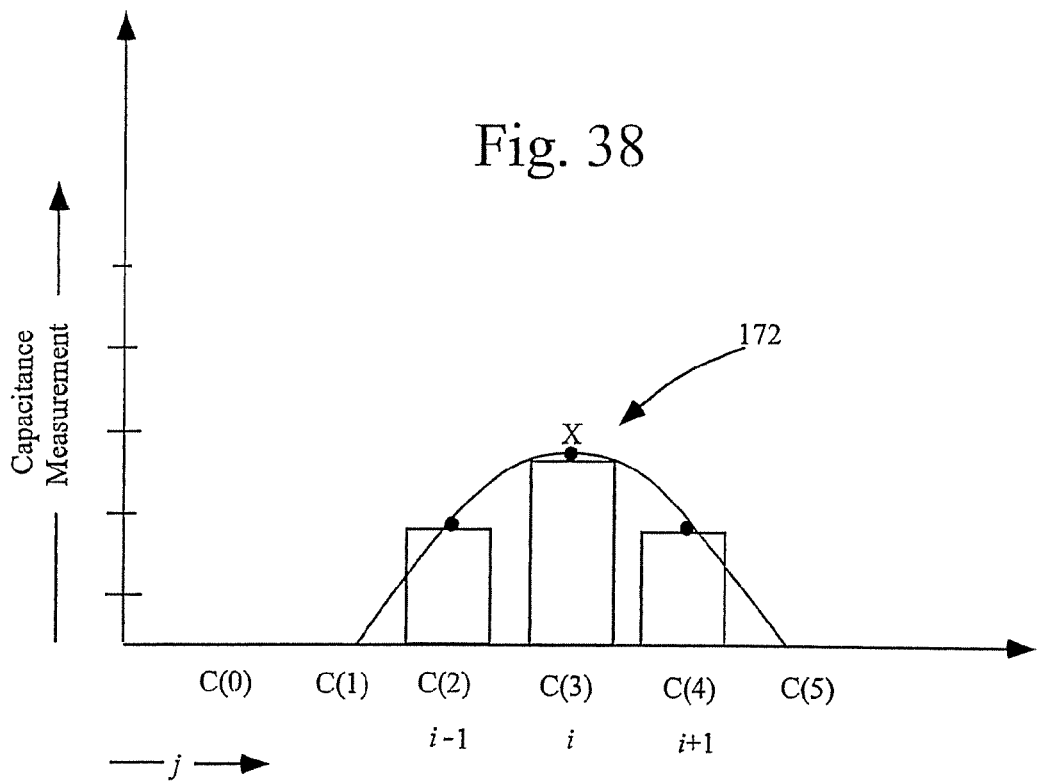
FIG. 40 is a graph of the second quadratic fitting step in which the three capacitance measurements from the three adjacent electrodes are fitted to an inverted parabola.

In the second "quadratic fitting" step, the three capacitance measurements from the three adjacent electrodes numbered i−1, i, and i+1 are fitted to an inverted parabola, as is illustrated in the graph in FIG. 40. The three (x, y) coordinate points (i−1,C(i−1)), (i,C(i)), and (i+1,C(i+1)) define a unique parabola or quadratic function by well-known mathematical principles. In a closed-loop sensor, the electrode numbering is taken modulo N so that electrodes 0 and N−1 are adjacent. Once the parameters of the parabola fitting the three electrodes are determined, the true mathematical center point X (indicated by arrow 172) of this parabola is calculated. This will be a fractional number near the value i. The number X can be reduced modulo N if necessary.

In the third, optional, "adjustment" step, the value X is passed through a non-linear function designed to compensate for any non-linearities due to non-idealities in the electrode design. It is realized that no sensor pattern will produce a completely ideal result for any particular interpolation algorithm. Therefore, the computed position will have some "wobble" as the input object moves around the length of the sensor.

However, because the sensor electrode pattern is rotationally symmetric, this wobble will repeat in equivalence to the spaces between the electrodes. The wobble will depend on where the input object is between two electrodes, and not on which electrode the input object is disposed. Mathematically, if the true input object position is $X_f$ and the interpolated position is X, then X=w($X_f$) for some "wobble" function w(x). Because w(x) is periodic, the position can be written in terms of its integer and fractional parts as $X_f$=int($X_f$)+frac($X_f$), and the wobble can be expressed as X=int($X_f$)+w(frac($X_f$)). The nature of w(x) can be determined theoretically or by experimental measurements; its inverse c(x) can then easily be computed or approximated using well-known techniques in the art. Because c is the inverse of w, the final computed position is X'=c(X)=c(w($X_f$))=$X_f$, so that X' is compensated to reproduce the true input object position $X_f$. Because w(x) is a periodic function, its inverse c(x) will also be periodic. Thus, the final computed position is calculated as X'=int(X)+c(frac(X))=int($X_f$)+c(w(frac($X_f$))=int($X_f$)+frac($X_f$)=$X_f$. This analysis assumes 0≦w(x)<1, which is not necessarily true; a somewhat more elaborate analysis shows that the technique works for any invertible periodic function w(x). It will be obvious to those skilled in the art that an analogous adjustment step can be used with any interpolation method on circular sensors.

The resulting position X', falling in the range 0≦X'<N, represents the angular position of the input object in units of electrodes. The number X' can be multiplied by 360/N to convert it into an angular position in degrees.

Figure 41:
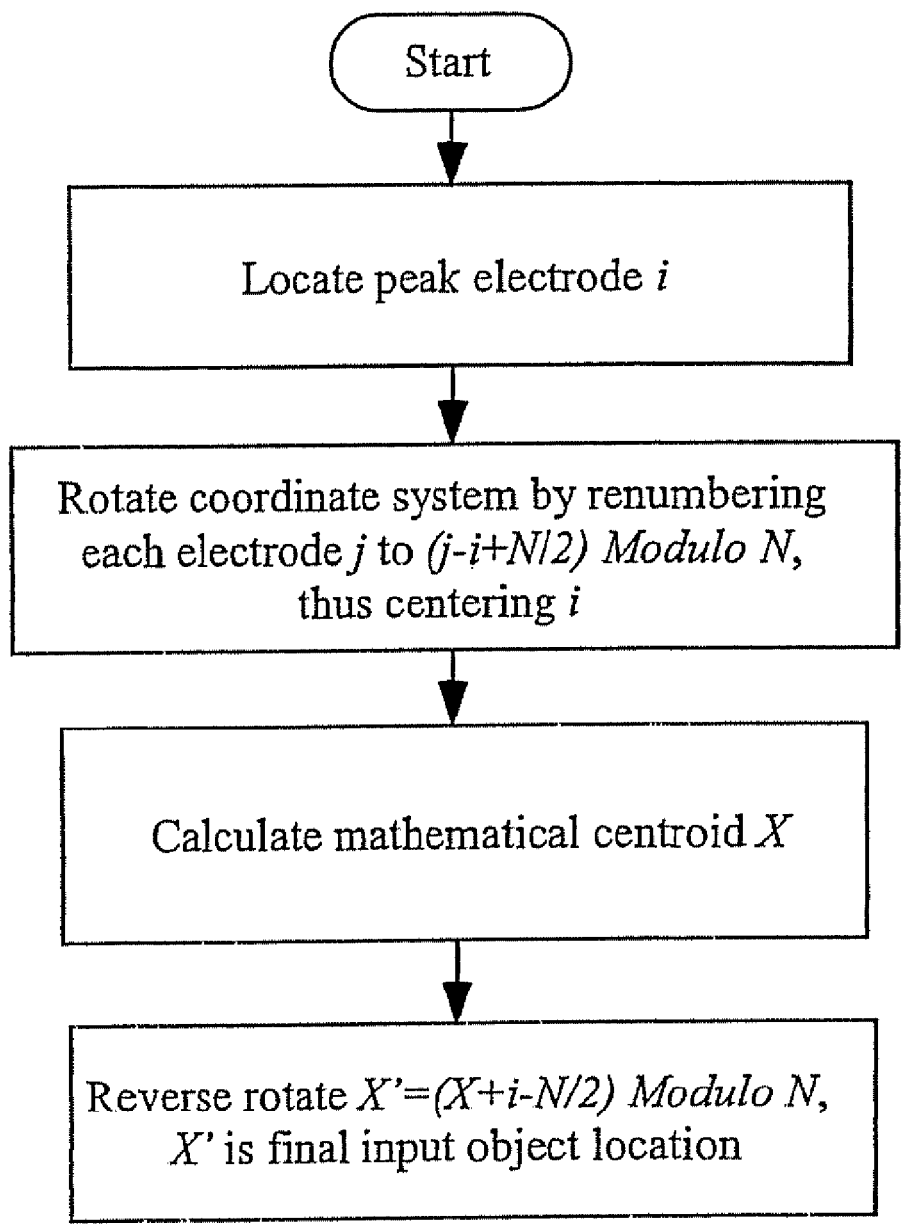
FIG. 41 is a flow chart of a method of calculating a position of an object on a closed-loop sensor by performing a centroid interpolation algorithm.

An alternate interpolation method, often used in the art, is centroid interpolation, as illustrated in FIG. 41. This method computes the mathematical centroid of the curve of capacitance measurements and is adapted to closed-loop sensors by locating the peak electrode number i, and then rotating the coordinate system by renumbering each electrode j to (j−i+N/2) modulo N. This moves peak electrode i to the approximate center of the sensor for purposes of the centroid calculation. After the centroid calculation produces a position X, the reverse rotation is applied, X'=(X+i−N/2) modulo N, to produce the final angular input object position.

Figure 42:
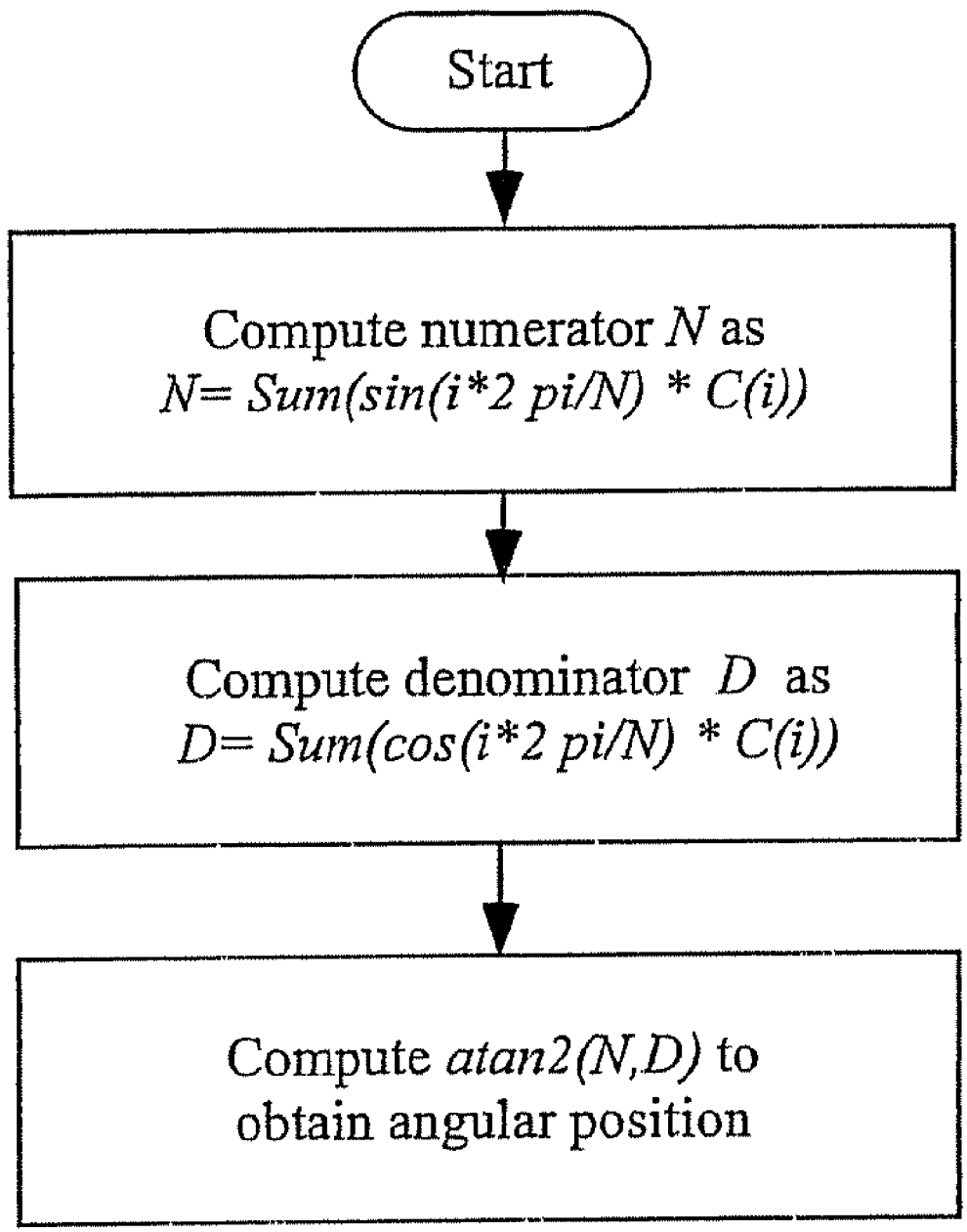
FIG. 42 is a flow chart of a method of calculating a position of an object on a closed-loop sensor by performing a trigonometric weighting algorithm.

A second way to adapt the centroid method is to use trigonometric weights, as illustrated in FIG. 42. In this method, a numerator N is computed as N=sum(sin(i*2*pi/N)*C(i)) and a denominator D is computed as D=sum(cos(i*2*pi/N)*C(i)), where C(i) is the capacitance measurements of the N electrodes and i ranges from 0 to N−1 in the sums. The arctangent atan(N/D) then yields the desired input object position. Preferably, a four-quadrant arctangent, commonly written atan 2(N,D), is used to obtain an angular position over the full circle. The sine and cosine weight factors are constants that can be pre-computed and tabulated. Because the sums N and D are linear in C(i), it is possible to distribute out the baseline subtraction C(i)=C'(i)−$C_0$(i) to become a simple subtraction of baseline sums $N_0$ and $D_0$. It may be preferable to use the trigonometric method when memory resources are too limited to store a full set of baseline capacitance values.

Figure 43:
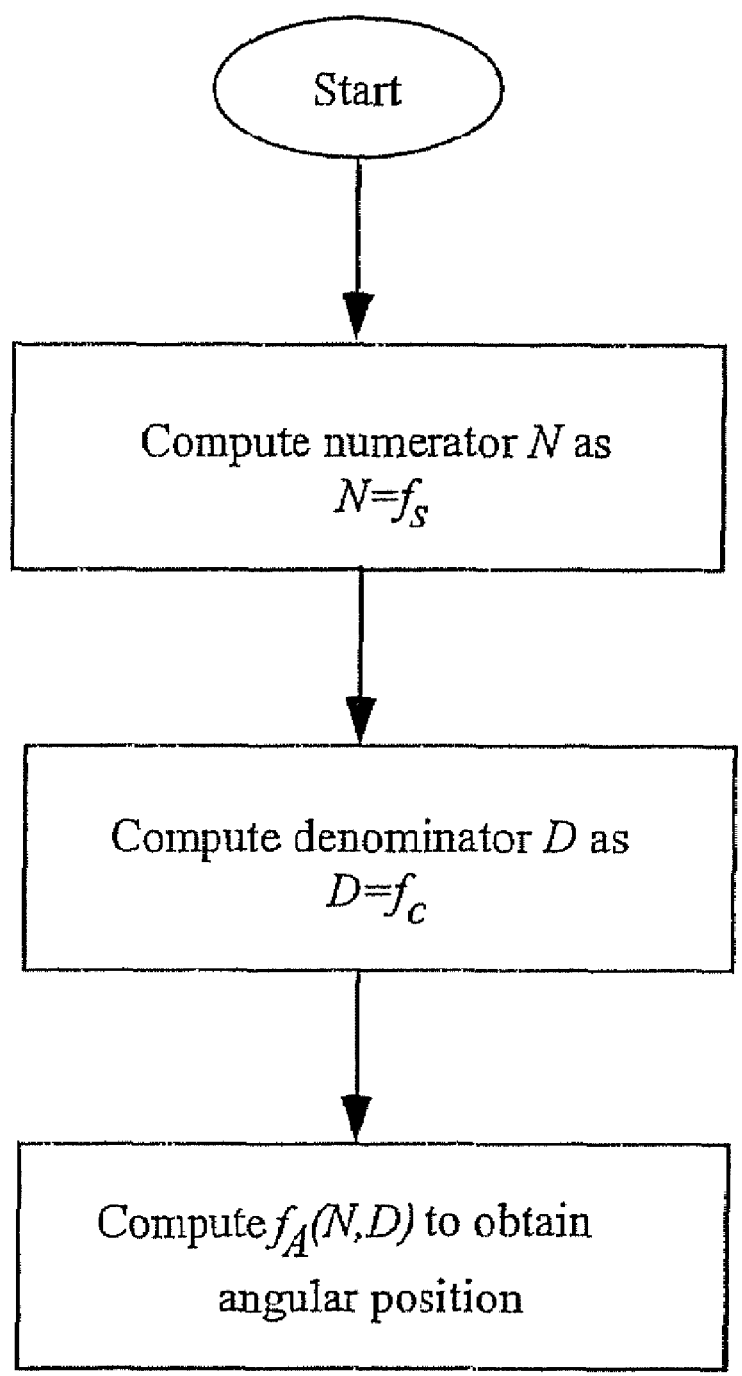
FIG. 43 is a flow chart of a method of calculating a position of an object on a closed-loop sensor by performing a quasi-trigonometric weighting algorithm.

A useful generalization of the above method is to use a quasi-trigonometric weighting method, as illustrated in FIG. 43. In substitution of standard sine, cosine, and arctangent trigonometric functions, other periodic functions $f_S$ and $f_C$, such as triangle waves, and corresponding inverse function $f_A(f_S, f_C)$, can be used. In the case of triangle waves, some loss of resolution is traded for greater linearity and simpler math calculations. The primary cause of this loss in resolution is due to the discontinuities in the triangle wave that generates discontinuities in the interpolation.

Figure 44:
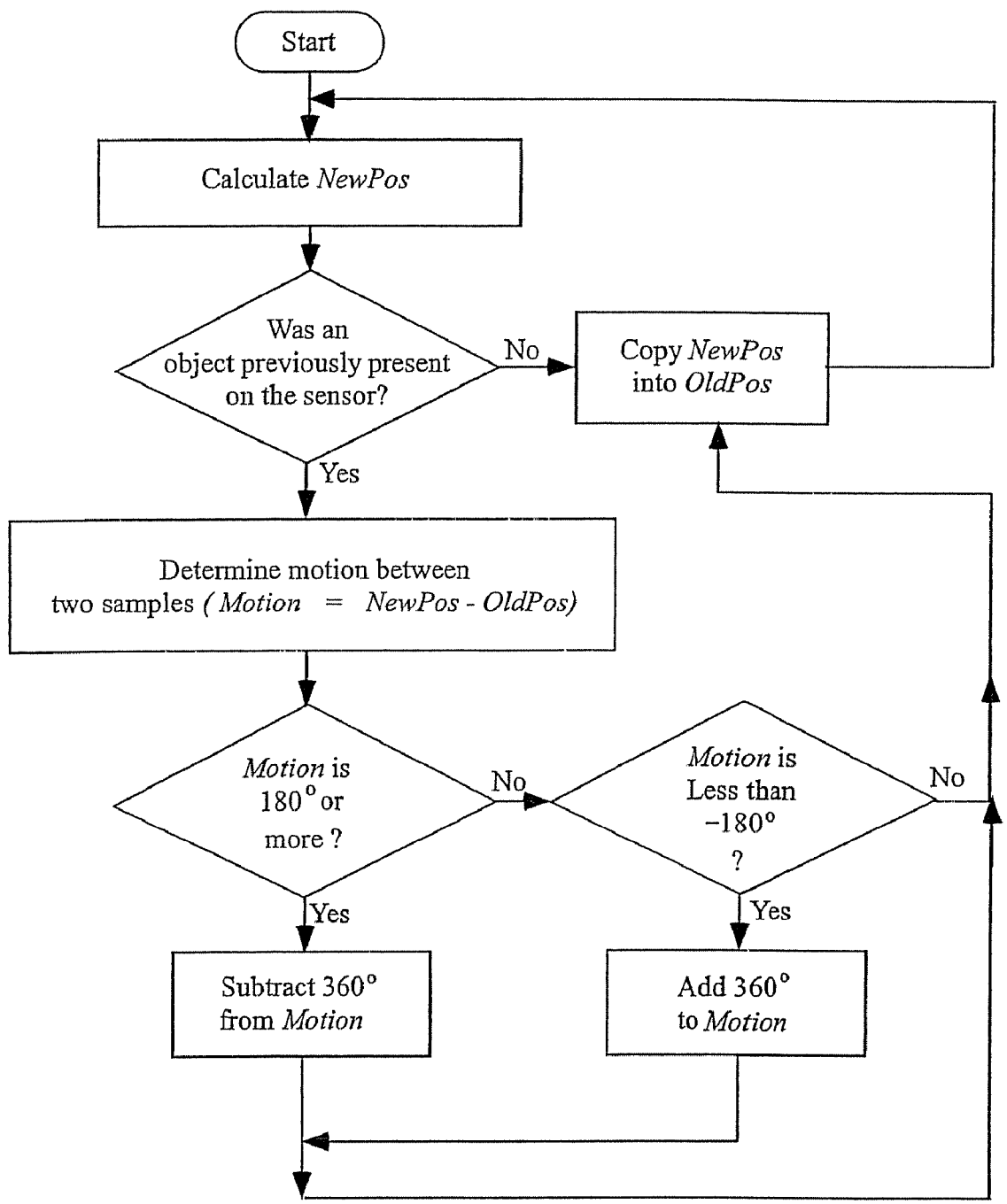
FIG. 44 is a flow chart of a method of determining relative motion of an object on a closed-loop sensor.

A loop path that inherently closes on itself poses an interesting challenge in determining motion from the positional data from the sensor. If data is sampled at discrete times, then the change in position at two different times can have occurred via two different directions. The method for determining motion for a closed-loop sensor is described as follows and is illustrated in FIG. 44.

After each sampling period, the input object position NewPos is calculated and it is determined whether an input object (e.g., finger, stylus, pen, implement, or other input object) is or is not present on the sensor. If the input object was not on the sensor during the previous sample, NewPos is copied into OldPos. If an input object is present, the following method is completed. Because the sensor is a closed loop, there are two paths an input object can take between any two points on the sensor. For example, if the first position (OldPos) is at 0 degrees and the second position (NewPos) is at 90 degrees, then the input object can have traveled 90 degrees from 0, 1, 2, ..., 88, 89, to 90 or the input object can have traveled 270 degrees from 0, 359, 358, ..., 92, 91, to 90. To resolve this, the assumption is made that the input object cannot travel more than 180 degrees around the sensor between two consecutive samples. To calculate motion, OldPos is subtracted from NewPos to determine the amount of motion between the two samples (Motion=NewPos−OldPos). If the resulting Motion is 180 degrees or more, the assumption is that the input object must have traveled the other direction, so 360 degrees is subtracted from Motion. Likewise, if the resulting Motion is less than −180 degrees, the assumption is that the input object must have traveled in the opposite direction, so 360 degrees is added to Motion. The "signed" modulo 360 of the result is thus taken such that the ultimate result of this motion calculation from one sample to the next, is constrained to, for example, $-180 \leq Motion < 180$ degrees around the sensor. The sign of Motion gives the direction of travel and the absolute value of Motion gives the magnitude or distance of travel. In all cases, the algorithm completes by copying NewPos onto OldPos.

This algorithm of determining motion, in which the input object is assumed to travel an angle of $-180 \leq Motion < 180$ degrees between two consecutive samples, can be generalized to accommodate different sampling rates and shapes or sizes of the loop. For alternate shapes or sizes of closed-loop sensors, appropriate assumptions of maximum angle, minimum angle, or maximum distance of travel can be made based on the closed-loop path layout and the sampling period. In the case of very long sampling periods or very small loop paths, when the maximum angle, minimum angle, or distance of travel is no longer sufficient for determining the path of travel of the object between two samples, then an assumption can be made about the more likely path (such as that the shorter path is more likely) or additional information can be used (such as using history of motion in the form of three or more samples to estimate the direction of travel).

The motion information output of this closed-loop sensor can be implemented in many ways and contain various amounts of information, including absolute positions or relative positions (i.e., motions). The motion output can also be used to emulate a physical wheel encoder and output two-bit gray code (sometimes called "quadrature states"), in which case the closed-loop sensor can be added to any existing device which accepts two-bit gray code with no modification to the original device's electronics.

When using a closed-loop sensor implemented on a two-dimensional touch sensor having both radial and circular sensor electrodes but without a physical constraint (or tactile guide) defining the closed-loop path, it is possible that the input object will gradually move out of the defined loop path. This may result in a variable scaling of the distance traveled to angular velocity, depending on the location of the motion with respect to the center of the motion, which may result in a calculated magnitude of input significantly different from that intended by the user. For example, small motions near the center of the defined loop path map to larger angular velocities than the same small motions near the periphery of the loop path. Users are typically more able to control the absolute distance traveled of the input object than the angle traveled by the input object relative to a defined center. Thus, for an input, in which the distance from the center is not useful, such as scrolling along a page or controlling the volume, users typically expect the output to be mapped to the distance traveled rather than to the angle, and may prefer small motions anywhere in the loop path to generate similar outputs.

Therefore, in the case where the user's input object is not physically constrained to a particular closed-loop path, some adjustment is desirable in the angular speed due to the user wandering closer and farther from the center point. If no adjustment were completed, positions closer to the center point would cause more angular change for a given amount of motion, which is not desirable from a human-factors point of view. Several adjustments are possible, including simply scaling the angular speed by 1/R, as well as more complicated and error prone scaling mechanisms, such as varying the center point to compensate for the estimated user deviation from the center of the loop path. Scaling the angular speed by 1/R involves dividing the angular speed by R (the radius from the center) of the system such that small motions near the center will not result in large outputs.

Figure 45:
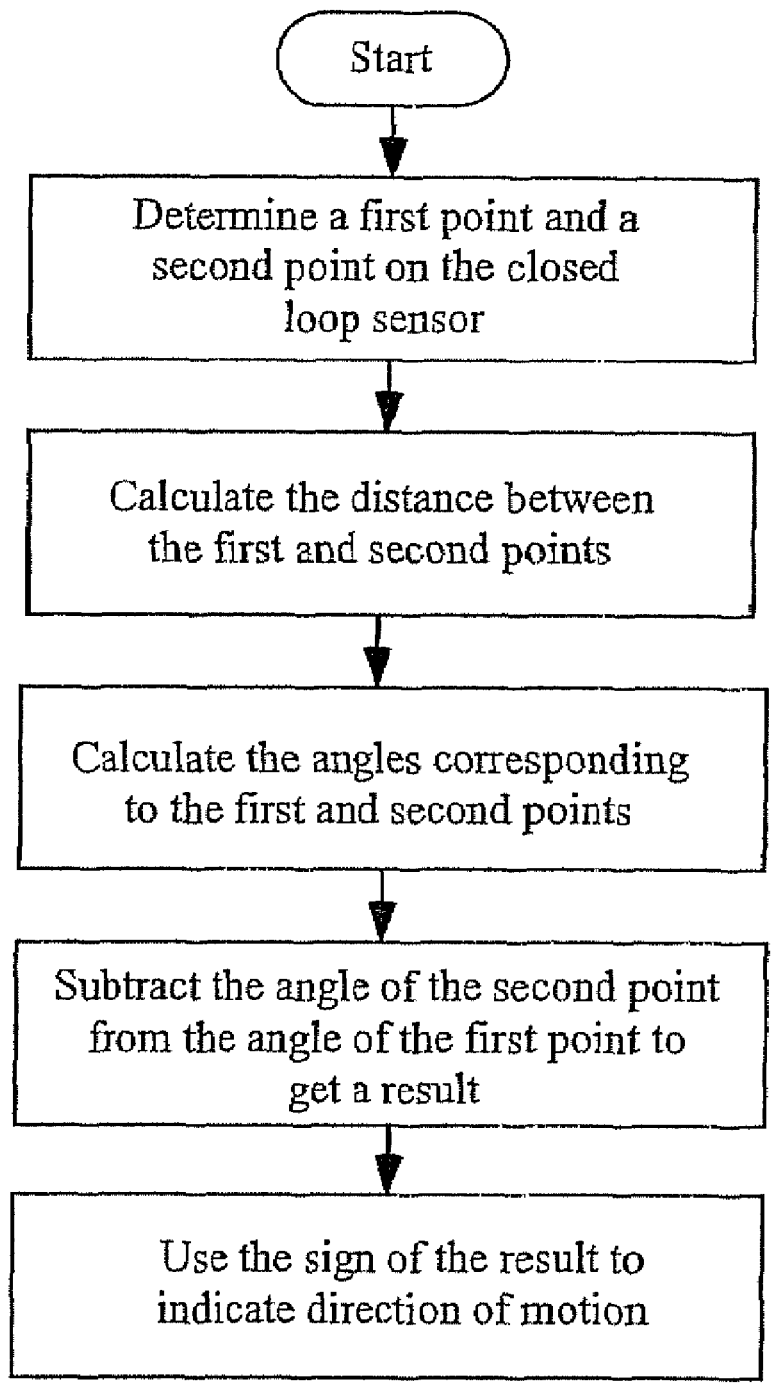
FIG. 45 is a flow chart of a method of using the angular component to determine the sign of the traversal along the closed-loop path.

Another method is to use the angular component solely to determine the sign of the traversal along the closed-loop path, and calculate the speed based only on the absolute motion of the object, as illustrated in FIG. 45. For example, given two consecutive points sampled from the closed-loop sensor, the straight-line distance is calculated between these two points (with an approximation to the Pythagorean Theorem or equivalent polar coordinate equations). Additionally, the angular positions corresponding to these two points along the closed-loop path are calculated by one of the means previously discussed. The angle of the second point is subtracted from the angle of the first point, and the sign of this result is used to indicate the direction of motion, while the absolute distance is used to indicate the amount of motion. This results in a more natural feeling correspondence between the motion of the user's input object and the corresponding variation in the controlled parameter (e.g., scrolling distance, menu traversal, or setting value).

In the case that the closed-loop sensor is not circular or substantially circular, the algorithms used to calculate position for a circular sensor could still be used to estimate an input object's position. In this case, the algorithm will indicate where the input object(s) is(are) in the closed loop of the closed-loop sensor, and software can decode the exact location based on knowledge of the local electrode design. For example, a closed-loop sensor having a rectangular loop with rounded corners can have software that can differentiate the signals generated by an object very near, or on, the corners versus the signals generated by an object along a linear portion of the rectangle. The previously discussed algorithms can generate this information and compensate.

The present disclosure discloses several advantages. A touch sensor is disclosed having a closed-loop sensor, or a designated loop path along which a user can move an input object, where the action of scrolling/selecting/varying is controlled by the motion of the input object along the loop path. For example, the direction, the distance of travel, or the speed of the input object can provide the control input. The closed-loop sensor also has the additional advantage of not being limited by mechanical design or human anatomy in enabling a user to maneuver through a document, through menus, or along a range of values for a control. For example, a user can easily move an input object around a closed-loop sensor in a continuous manner, and draw a plurality of loops within the sensor area, with the number of loops drawn limited only by the fatigue of the user or the functional life of the sensor.

The present invention has many uses, including for scrolling, moving through a menu, A/V uses (fast forward, rewind, zoom, pan, volume, balance, etc.), two-dimensional/three dimensional data presentation, selection, drag-and-drop, cursor control, and the like. Many applications have application-specific elements that can benefit from the type of control achieved by using the closed-loop sensor of the present invention. For example, a game can benefit from having a continuously variable control that can be used as a steering wheel, a dial, or other control that indicates direction and magnitude of motion. Another example is for use with a CAD program that allows the user to rotate/translate/scale the viewpoint of a model or to vary the color of an element smoothly. A further example is a text editor, which can benefit from a smooth and continuously varying input to control the zoom level of its text. In general, any application parameter or control that needs to vary over a large range of possible values can benefit from the present invention. Physical processes (e.g., to control the position of a platform, the speed of a motor, the temperature or lighting in a compartment, and the like) can also benefit from the use of closed-loop sensors.

The closed-loop sensor of the present disclosure frees users from targeting tasks or from remembering complex combinations of controls by allowing designers of applications or operating systems to reduce scroll bars and other similar display controls to mere indicators of the current scrolled position or control value. If scroll bars and similar display controls can be reduced to mere indicators, their size can be reduced and their positions at the edge of the screen, edge of a window, or other specific location on the screen or window will consume negligible space. Additionally, the freedom offered by reducing scroll bars and similar display controls might allow menus to be less hierarchical, which further reduces control and display complexity.

The manufacturing cost and complexity of a host system can be reduced by using a single solid state sensor with multiple closed loops to replace many of the various controls currently present on such systems. The manufacturing cost and complexity of incorporating closed-loop sensors into a host system can also be reduced by integrating the closed-loop sensor with existing object position sensors (e.g. touch pads and touch screens) and taking advantage of existing sensor inputs to the electronics of the existing position sensor. Portions of a general-purpose position sensor, such as the sensor regions, the electronics, and the firmware or driver of the general-purpose position sensor, can be reused with closed-loop sensors, which can provide further savings in space and money.

Additionally, the solid-state nature of capacitive and inductive closed-loop sensors makes them more reliable and durable. Such sensors can be sealed and used in environments where knobs and other physical controls are impractical. The present invention can also be made smaller than knobs or other physical controls, and requires very little space and can be custom made to almost any size. Additionally, the operation of the sensor has low power requirements, making it ideal for portable notebook computers, personal digital assistants (PDAs), and personal entertainment devices.

The closed-loop sensor can also be used to provide additional information that a knob or scroll bar would not, such as the size of the contact between the object on the sensor and the sensor itself. Additionally, some closed-loop sensors may be able to distinguish between a finger and a pen, or indicate some other quality or orientation of the input object. This information can further be used to increase the functionality of the controller through "gestures" on the closed-loop sensor. For example, the speed or range of scrolling or display adjustment can be adjusted as a function of the speed of the input object's motion or the distance traveled by the input object. Additional gestures, such as tapping, executing predefined motion patterns, having a stationary input object and a moving input object simultaneously, or moving two input objects in two directions along the loop of the sensor, can indicate different actions to the host device. The starting point of contact of the input object to the host device program for the input can also be used. For example, a motion starting from a first region of the sensor and progressing in a first direction can indicate panning of the display, while motion starting from the same first region and progressing in a second direction can indicate zooming of the display. Meanwhile, a motion starting from a second region can indicate a desire to scroll horizontally, and the direction of motion can indicate the direction of scroll. This can be extrapolated to additional regions that map to additional functions.

While the invention has been described with reference to an exemplary embodiment, it will be understood by those skilled in the art that various changes may be made and equivalents may be substituted for elements thereof without departing from the scope of the present invention. In addition, many modifications may be made to adapt a particular situation or material to the teachings without departing from the essential scope thereof. Therefore, it is intended that the invention not be limited to the particular embodiments disclosed as the best mode contemplated for carrying out the present invention, but that the present invention will include all embodiments falling within the scope of the claims.

What is claimed is:

1. An object position detector, comprising:
   a processor comprising a plurality of sensor inputs;
   a first touch sensor configured to sense an object proximate to a substantially closed loop, the touch sensor comprising a first plurality of sensor electrodes disposed along the substantially closed loop, wherein a first sensor electrode of the first plurality of sensor electrodes is coupled to a first sensor input of the plurality of sensor inputs; and
   a second touch sensor comprising a second plurality of sensor electrodes, the second touch sensor configured to sense an object proximate to the second plurality of sensor electrodes, wherein a first sensor electrode of the second plurality of sensor electrodes is coupled to both the first sensor electrode of the first plurality of sensor electrodes and the first sensor input of the plurality of sensor inputs,
   wherein the processor is configured to provide first data responsive to the first touch sensor sensing the object proximate to the substantially closed loop and to provide second data responsive to the second touch sensor sensing the object proximate to the second plurality of sensor electrodes.

2. The object position detector of claim 1, wherein the first touch sensor further comprises an indicator electrode disposed proximate to the first plurality of sensor electrodes and coupled to a second sensor input of the plurality of sensor inputs, the indicator electrode configured to sense the object proximate to the substantially closed loop.

3. The object position detector of claim 2, wherein the second touch sensor further comprises a second indicator electrode disposed proximate to the second plurality of sensor electrodes and coupled to a third sensor input of the plurality of sensor inputs, the second indicator electrode configured to sense the object proximate to the second plurality of sensor electrodes.

4. The object position detector of claim 1, wherein the second plurality of sensor electrodes comprises a first subset of sensor electrodes for sensing motion of the object proximate to the second plurality of electrodes along a first axis, the first subset of sensor electrodes coupled to a first subset of the plurality of sensor inputs, and wherein the second plurality of sensor electrodes further comprises a second subset of sensor electrodes for sensing motion of the object proximate to the second plurality of electrodes along a second axis, the second subset of sensor electrodes coupled to a second subset of the plurality of sensor inputs, and wherein the first plurality of sensor electrodes are electrically coupled to both the first subset of sensor electrodes and the first subset of the plurality of sensor inputs.

5. The object position detector of claim 4, further comprising:
a third touch sensor comprising a third plurality of sensor electrodes, the third touch sensor configured to sense an object proximate to the third plurality of sensor electrodes, wherein the third plurality of sensor electrodes are electrically coupled to portions of the first subset of sensor electrodes and portions of the first subset of the plurality of sensor inputs that are not coupled to the first plurality of sensor electrodes.

6. The object position detector of claim 4, further comprising:
a third touch sensor comprising a third plurality of sensor electrodes, the third touch sensor configured to sense an object proximate to the third plurality of sensor electrodes, wherein the third plurality of sensor electrodes are electrically coupled to both the second subset of sensor electrodes and the second subset of the plurality of sensor inputs.

7. The object position detector of claim 1, wherein the first touch sensor and the second touch sensor are both capacitance touch sensors.

8. The object position detector of claim 1, wherein the second plurality of electrodes is disposed along a second substantially closed loop.

9. The object position detector of claim 1, wherein the second plurality of electrodes is disposed along a second substantially closed loop nested with the substantially closed loop.

10. An object position detector, comprising:
a first touch sensor comprising a first plurality of sensor electrodes disposed along a first substantially closed loop, the first plurality of sensor electrodes configured to sense an object proximate to the first substantially closed loop;
a second touch sensor comprising a second first plurality of sensor electrodes disposed along a second substantially closed loop, the second plurality of sensors configured to sense an object proximate to the second substantially closed loop; and
a processor configured to process signals from the first touch sensor to determine motion of the object proximate the first substantially closed loop and to effect a first function responsive to motion of the object proximate the first substantially closed loop being substantially along the first substantially closed loop, and to process signals from the second touch sensor to determine motion of the object proximate the second substantially closed loop and to effect a second function responsive to motion of the object proximate the second substantially closed loop being substantially along the second substantially closed loop.

11. The object position detector of claim 10, wherein the first substantially closed loop and the second substantially closed loop are nested.

12. The object position detector of claim 11, wherein the first substantially closed loop and the second substantially closed loop are both circular, and the processor is further configured to interpolate signals from the first touch sensor and the second touch sensor to determine radial positional information.

13. The object position detector of claim 10, wherein the first function and the second function are both audio functions.

14. An object position detector, comprising:
a processor comprising a plurality of sensor inputs;
a first touch sensor comprising a first plurality of sensor electrodes disposed in a substantially closed loop, the first touch sensor configured to sense an object proximate to the substantially closed loop; and
a second touch sensor comprising a second plurality of sensor electrodes, the second touch sensor configured to sense an object proximate to the second plurality of sensor electrodes,
wherein the processor is configured to provide first data responsive to the first touch sensor sensing the object proximate to the substantially closed loop and to provide second data responsive to the second touch sensor sensing the object proximate to the second plurality of sensor electrodes, and wherein each sensor electrode in the first plurality of sensor electrodes is coupled to a sensor input of the plurality of sensor inputs, and wherein each sensor electrode in the second plurality of sensor electrodes is coupled to a sensor input of the plurality sensor inputs such that each sensor electrode in the first plurality of sensor electrode shares a sensor input with a sensor electrode in the second plurality of sensor electrodes.

15. The object position detector of claim 14, wherein the first touch sensor further comprises an indicator electrode disposed proximate to the first plurality of sensor electrodes and coupled to the processor, the indicator electrode configured to sense an object proximate to the first plurality of sensor electrodes such that the processor can distinguish between an object proximate the first plurality of sensor electrodes and an object proximate the second plurality of sensor electrodes.

16. The object position detector of claim 14, wherein the second touch sensor further comprises an indicator electrode disposed proximate to the second plurality of sensor electrodes and coupled to the processor, the indicator electrode configured to sense an object proximate to the second plurality of sensor electrodes such that the processor can distinguish between an object proximate the first plurality of sensor electrodes and an object proximate the second plurality of sensor electrodes.

17. A method for providing an object position detector, comprising:
- providing a processor having a plurality of sensor inputs;
- providing a first capacitive touch sensor configured to sense an object proximate to a substantially closed loop, the providing a first touch sensor comprising disposing a first plurality of sensor electrodes along the substantially closed loop and coupling a first sensor electrode of the first plurality of sensor electrodes to a first sensor input of the plurality of sensor inputs; and
- providing a second capacitive touch sensor configured to sense an object proximate to a second plurality of sensor electrodes, the providing a second touch sensor comprising disposing a second plurality of sensor electrodes and coupling a first sensor electrode of the second plurality of sensor electrodes to both the first sensor electrode of the first plurality of sensor electrodes and the first sensor input of the plurality of sensor inputs, wherein the processor is configured to provide first data responsive to the first touch sensor sensing the object proximate to the substantially closed loop and to provide second data responsive to the second touch sensor sensing the object proximate to the second plurality of sensor electrodes.

18. The method of claim 17, wherein providing a first touch sensor further comprises disposing an indicator electrode disposed proximate to the first plurality of sensor electrodes and coupling the indicator electrode to a second sensor input of the plurality of sensor inputs, wherein the indicator electrode configured to sense the object proximate to the substantially closed loop.

19. The method of claim 17, wherein disposing a second plurality of sensor electrodes comprises disposing the second plurality of electrodes along a second substantially closed loop.

20. The method of claim 17, wherein disposing a second plurality of sensor electrodes comprises disposing the second plurality of electrodes in a second substantially closed loop nested with the substantially closed loop.

* * * * *